(12) United States Patent
Horiuchi

(10) Patent No.: US 11,626,043 B2
(45) Date of Patent: Apr. 11, 2023

(54) MULTILAYERED PRINTED MATTER AND MULTILAYER PRINTING METHOD

(71) Applicant: MIMAKI ENGINEERING CO., LTD., Nagano (JP)

(72) Inventor: Yuhei Horiuchi, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 0 days.

(21) Appl. No.: 17/369,925

(22) Filed: Jul. 7, 2021

(65) Prior Publication Data

US 2021/0335156 A1    Oct. 28, 2021

Related U.S. Application Data

(62) Division of application No. 16/059,060, filed on Aug. 9, 2018, now Pat. No. 11,120,711.

(30) Foreign Application Priority Data

Aug. 30, 2017 (JP) ............................. JP2017-165407
Oct. 2, 2017 (JP) ............................. JP2017-192535

(51) Int. Cl.
*B42D 25/351* (2014.01)
*G09F 19/12* (2006.01)
*G09F 13/20* (2006.01)
*G06F 3/12* (2006.01)
*B42D 25/00* (2014.01)

(52) U.S. Cl.
CPC ............. *G09F 19/12* (2013.01); *B42D 25/00* (2014.10); *B42D 25/351* (2014.10); *G06F 3/1279* (2013.01); *G09F 13/20* (2013.01)

(58) Field of Classification Search
CPC .......................... B42D 25/351; B42D 2035/36
See application file for complete search history.

(56) References Cited

U.S. PATENT DOCUMENTS

| 4,307,899 | A | * | 12/1981 | Hoppe | ............... B42D 25/333 359/888 |
|---|---|---|---|---|---|
| 6,089,614 | A | * | 7/2000 | Howland | ............ B42D 25/355 428/209 |
| 2007/0132227 | A1 | * | 6/2007 | Dean | ................... B41M 3/148 283/72 |

FOREIGN PATENT DOCUMENTS

| JP | 2004226478 | 8/2004 |
|---|---|---|
| JP | 2009223270 | 10/2009 |
| JP | 2018180158 | 11/2018 |

OTHER PUBLICATIONS

Office Action of Japan Counterpart Application, with English translation thereof, dated Jul. 14, 2021, pp. 1-13.

* cited by examiner

*Primary Examiner* — Kyle R Grabowski
(74) *Attorney, Agent, or Firm* — JCIPRNET

(57) ABSTRACT

A multilayered printed matter includes a group of print layers formed on a medium. The group of layers include a front layer and a back layer on which patterns are printed, a white layer, and a black layer. The white layer is interposed between the front layer and the back layer to conceal the back layer to be invisible from the side of the front layer. The white layer reflects incident light from the side of the front layer to allow the front layer to be visible from the side of the front layer. The black layer is interposed between the white layer and the back layer to conceal the back layer to be invisible from the side of the front layer. In comparison between the black layer and the white layer that are equal in thickness, the black layer exerts a higher light blocking effect than the white layer.

19 Claims, 19 Drawing Sheets

MULTILAYERED PRINTED MATTER AND MULTILAYER PRINTING METHOD

CROSS REFERENCE TO RELATED APPLICATIONS

This application is a divisional application of U.S. application Ser. No. 16/059,060, filed on Aug. 9, 2018, which claims the priority benefit of Japanese Patent Application No. 2017-165407, filed on Aug. 30, 2017 and No. 2017-192535, filed on Oct. 2, 2017. The entirety of each of the above-mentioned patent application is hereby incorporated by reference herein and made a part of this specification.

TECHNICAL FIELD

This disclosure relates to a multilayered printed matter in which a group of print layers are formed on a medium, and a multilayer printing method for producing the multilayered printed matter.

DESCRIPTION OF THE BACKGROUND ART

Conventionally, transparent or semitransparent sheets are known in the relevant technical field that include patterns printed on both of their front and back surfaces (for example, Japanese Unexamined Patent Publication No. 2009-128734). When the sheet described in Japanese Unexamined Patent Publication No. 2009-128734 is receiving light from the front-surface side alone, with no light from a light source disposed on the back-surface side, it is mostly a pattern on the front surface that is visible from the front-surface side. On the other hand, when the sheet described in Japanese Unexamined Patent Publication No. 2009-128734 is being exposed to light emitted from the light source disposed on the back-surface side, with light coming from the front-surface side being substantially blocked, light from the light source allows a pattern on the back surface to be visible from the front-surface side, and the pattern may be more easily caught by the eye from the front-surface side than when observed without light emitted from the light source.

Patent Literature: Japanese Unexamined Patent Publication No. 2009-128734

SUMMARY

An issue with the sheet described in Japanese Unexamined Patent Publication No. 2009-128734 is that the pattern on the back surface may emerge into view under light from the front-surface side alone when observed from the front-surface side, even without light from the light source disposed on the back-surface side.

This disclosure is directed to providing a multilayered printed matter in which, among a plurality of patterns, a pattern closer to a light source disposed on the side of a back surface may be better concealed to be invisible from the side of a front surface in the absence of light from the light source, and a multilayer printing method for producing the multilayered printed matter.

This disclosure provides a multilayered printed matter in which a group of print layers are formed on a medium, the group of layers including: a first pattern print layer and a second pattern print layer on which patterns are printed; a first concealment print layer interposed between the first pattern print layer and the second pattern print layer so as to conceal the second pattern print layer to be invisible from a side of the first pattern print layer, the first concealment print layer reflecting incident light from the side of the first pattern print layer to allow the first pattern print layer to be visible from the side of the first pattern print layer; and a second concealment print layer interposed between the first concealment print layer and the second pattern print layer so as to conceal the second pattern print layer to be invisible from the side of the first pattern print layer. In comparison between the first concealment print layer and the second concealment print layer that are equal in thickness, the second concealment print layer exerts a higher light blocking effect than the first concealment print layer.

The multilayered printed matter disclosed herein is thus provided with the first and second concealment print layers that are interposed between the first and second pattern print layers. According to the configuration, the second pattern print layer may be better concealed in the multilayered printed matter being observed from the opposite side of the second pattern print layer across the first pattern print layer under light coming from the side of the first pattern print layer, with no light from a light source disposed on the opposite side of the first pattern print layer across the second pattern print layer. In the multilayered printed matter disclosed herein, among a plurality of patterns, a pattern closer to the light source disposed on the back-surface side may be better concealed to be invisible from the front-surface side in the absence of light from the light source. In the multilayered printed matter disclosed herein, the second concealment print layer exerts a higher light blocking effect than the first concealment print layer in comparison between the first and second concealment print layers that are equal in thickness. The combination of two concealment print layers thinner than one (first) concealment print layer may accordingly offer comparable concealability. Therefore, the whole concealment print layers may be favorably decreased in thickness in the multilayered printed matter. In the multilayered printed matter under light emitted from the light source disposed on the opposite side of the first pattern print layer across the second pattern print layer, with light coming from the side of the first pattern print layer being substantially blocked, light emitted from the light source and transmitting through the concealment print layers may be scattered by the concealment print layers. In the multilayered printed matter configured as described above, however, the amount of scattering light may be reduced, and light emitted from the light source may consequently allow the second pattern print layer to be clearly visible from the side of the first pattern print layer.

In the multilayered printed matter disclosed herein, the first concealment print layer and the second concealment print layer may conceal the second pattern print layer when the multilayered printed matter is observed from the opposite side of the second pattern print layer across the first pattern print layer under light coming from the side of the first pattern print layer, with no light from the light source disposed on the opposite side of the first pattern print layer across the second pattern print layer. Further, the first concealment print layer and the second concealment print layer may allow the second pattern print layer to be visible from the side of the first pattern print layer using light emitted from the light source when the multilayered printed matter is observed from the opposite side of the second pattern print layer across the first pattern print layer under light emitted from the light source, with light coming from the side of the first pattern print layer toward the multilayered printed matter being substantially blocked.

In the multilayered printed matter disclosed herein, the second concealment print layer may be smaller in thickness than the first concealment print layer.

In case ink is the material of the concealment print layers, ink consumption may be favorably decreased in the multilayered printed matter thus configured.

In the multilayered printed matter disclosed herein, the second concealment print layer may be a black layer.

By using the black layer as the second concealment print layer, an adequately high light blocking effect may be achievable. In the multilayered printed matter, therefore, the second concealment print layer may be reduced in thickness.

In the multilayered printed matter disclosed herein, the first concealment print layer may be a white layer.

In the multilayered printed matter thus configured, the first concealment print layer may have a high degree of lightness. Therefore, when the first pattern print layer is observed from the opposite side of the second pattern print layer across the first pattern print layer under light coming from the side of the first pattern print layer, with no light from the light source disposed on the opposite side of the first pattern print layer across the second pattern print layer, the pattern presented by the first pattern print layer may be improved in lightness by the first concealment print layer that excels in lightness.

In the multilayered printed matter disclosed herein, at least one of the first concealment print layer and the second concealment print layer may be partly unformed for the first pattern print layer in a layer-stacking direction.

In the multilayered printed matter thus configured under light emitted from the light source disposed on the opposite side of the first pattern print layer across the second pattern print layer, with light coming from the side of the first pattern print layer being substantially blocked, light emitted from the light source may be easily transmitted through a region where at least one of the first concealment print layer and the second concealment print layer is unformed for the first pattern print layer in the layer-stacking direction. This may allow for a highlighted display of the region where at least one of the first concealment print layer and the second concealment print layer is unformed for the first pattern print layer in the layer-stacking direction when the multilayered printed matter is observed from the opposite side of the second pattern print layer across the first pattern print layer under light emitted from the light source disposed on the opposite side of the first pattern print layer across the second pattern print layer, with light coming from the side of the first pattern print layer being substantially blocked.

This disclosure further provides a multilayer printing method for forming a group of print layers on a medium, the group of print layers including: a first pattern print layer and a second pattern print layer on which patterns are printed; a first concealment print layer interposed between the first pattern print layer and the second pattern print layer so as to conceal the second pattern print layer to be invisible from a side of the first pattern print layer, the first concealment print layer reflecting incident light from the side of the first pattern print layer to allow the first pattern print layer to be visible from the side of the first pattern print layer; and a second concealment print layer interposed between the first concealment print layer and the second pattern print layer so as to conceal the second pattern print layer to be invisible from the side of the first pattern print layer. In comparison between the first concealment print layer and the second concealment print layer that are equal in thickness, the second concealment print layer exerts a higher light blocking effect than the first concealment print layer.

A multilayered printed matter obtained by the multilayer printing method is provided with the concealment print layers that are interposed between the first pattern print layer and the second pattern print layer. According to the configuration, the second pattern print layer may be better concealed in the multilayered printed matter being observed from the opposite side of the second pattern print layer across the first pattern print layer under light coming from the side of the first pattern print layer, with no light from a light source disposed on the opposite side of the first pattern print layer across the second pattern print layer. In the multilayered printed matter produced by the multilayer printing method, among a plurality of patterns, a pattern closer to the light source disposed on the back-surface side may be better concealed to be invisible from the front-surface side in the absence of light from the light source. In the multilayered printed matter produced by the multilayer printing method, the second concealment print layer exerts a higher light blocking effect than the first concealment print layer in comparison between the first concealment print layer and the second concealment print layer that are equal in thickness. The combination of two concealment print layers thinner than one (first) concealment print layer may accordingly offer comparable concealability. Therefore, the whole concealment print layers may be favorably decreased in thickness in the multilayered printed matter produced by the multilayer printing method. In the multilayered printed matter produced by the multilayer printing method under light emitted from the light source disposed on the opposite side of the first pattern print layer across the second pattern print layer, with light coming from the side of the first pattern print layer being substantially blocked, light emitted from the light source and transmitting through the concealment print layers may be scattered by the concealment print layers. In the multilayered printed matter configured as described above, however, the amount of scattering light may be reduced, and light emitted from the light source may consequently allow the second pattern print layer to be clearly visible from the side of the first pattern print layer.

In the multilayer printing method disclosed herein, the group of print layers are formed by an inkjet printer equipped with a first head that is an inkjet head that ejects ink to form the first pattern print layer, a second head that is an inkjet head that ejects ink to form the first concealment print layer, a third head that is an inkjet head that ejects ink to form the second concealment print layer, and a fourth head that is an inkjet head that ejects ink to form the second pattern print layer. The first, second, third, and fourth heads are arranged in this order from an upstream side toward a downstream side in a certain direction. The group of print layers may be formed by moving either one of the medium and a group of the first, second, third, and fourth heads relative to the other solely in one of the certain direction and a direction opposite to the certain direction.

The multilayer printing method thus configured may successfully print at once all of the four layers; first pattern print layer, second pattern print layer, first concealment print layer, and second concealment print layer, by just moving the medium relative to the inkjet heads solely in one of the certain direction and a direction opposite to the certain direction. This multilayer printing method may achieve an improved accuracy in positioning the print layers relative to one another, as compared with any methods in which the print layers are formed one by one in their entirety, and may accordingly provide a multilayered printed matter improved in quality.

The multilayer printing method disclosed herein may be further characterized in that inks are ejected from the first, second, third, and fourth heads onto the medium while either one of the medium and the group of the first, second, third, and fourth heads is being moved relative to the other in a main scanning direction, regions targeted for ink ejection from the first, second, third, and fourth heads have an equal length in a sub scanning direction orthogonal to the main scanning direction, the first, second, third, and fourth heads are displaced from one another in the sub scanning direction by a dimension corresponding to the equal length, the certain direction is one of directions included in the sub scanning direction, and the medium is moved relative to the first, second, third, and fourth heads in one of the directions included in the sub scanning direction by a dimension corresponding to the equal length in the sub scanning direction upon completion of each printing cycle using the first, second, third, and fourth heads in the main scanning direction.

The multilayer printing method thus configured may successfully print at once all of the four layers; first pattern print layer, second pattern print layer, first concealment print layer, and second concealment print layer, by just moving the medium relative to the inkjet heads in one of the directions included in the sub scanning direction. This advantageous feature may achieve an improved accuracy in positioning the print layers relative to one another, as compared with any methods that form the print layers one by one in their entirety, and may accordingly provide a multilayered printed matter improved in quality.

In the multilayered printed matter and the multilayer printing method disclosed herein, among a plurality of patterns, a pattern closer to a light source disposed on the back-surface side may be better concealed to be invisible from the front-surface side in the absence of light from the light source.

DETAILED DESCRIPTION OF EMBODIMENTS

Embodiments of this disclosure are hereinafter described referring to the accompanying drawings.

First, a multilayered printed matter according to an embodiment is described.

Figure 1:
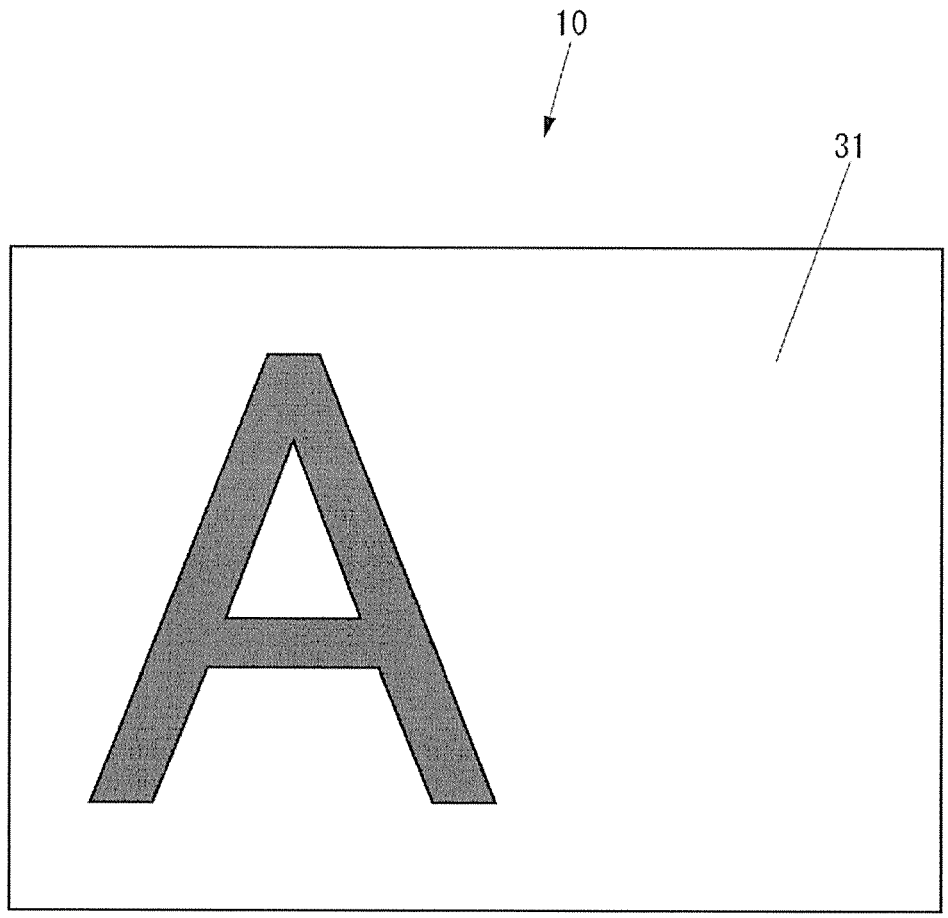
FIG. 1 is a plan view of a multilayered printed matter according to an embodiment of this disclosure.
Figure 2:
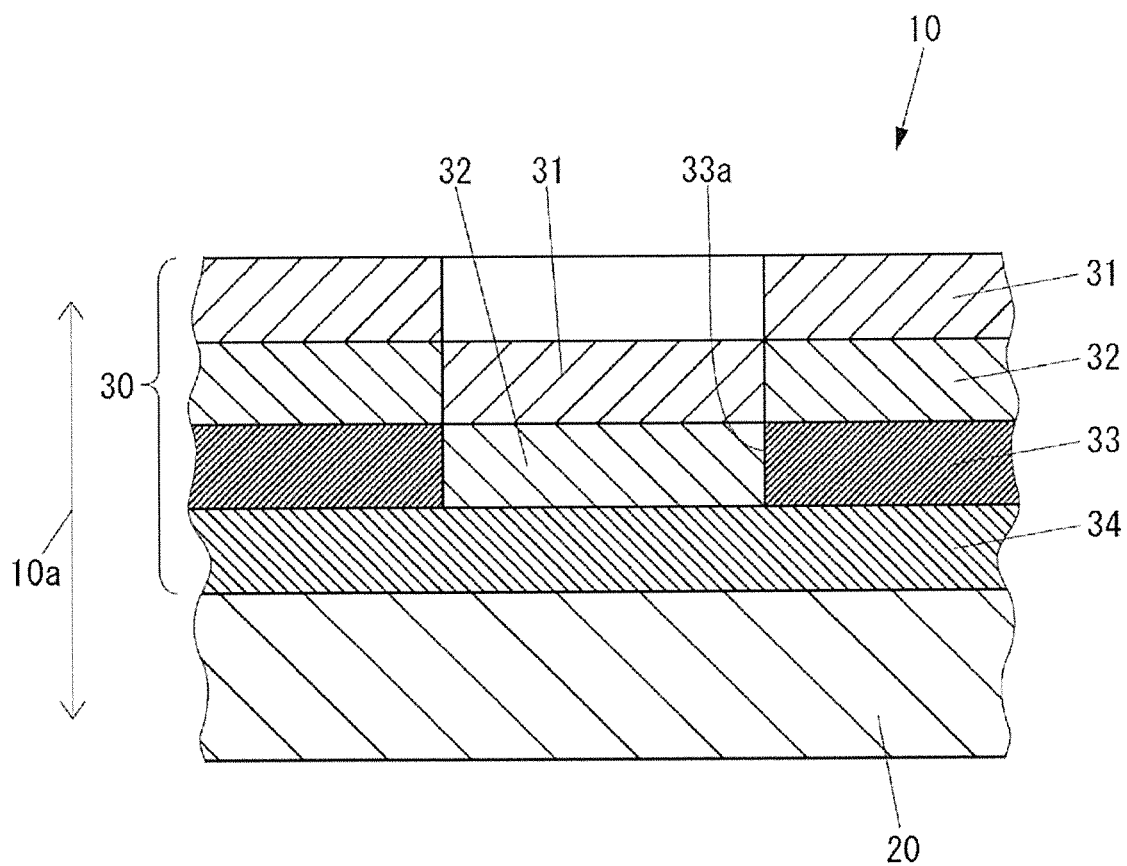
FIG. 2 is a side view of the multilayered printed matter illustrated in FIG. 1.

FIG. 1 is a plan view of a multilayered printed matter 10 according to this embodiment. FIG. 2 is a side view of the multilayered printed matter 10.

As illustrated in FIGS. 1 and 2, the multilayered printed matter 10 includes a medium 20, and a group of print layers 30 formed on the medium 20.

The medium 20 may be a transparent medium or an opaque medium.

The group of print layers 30 include a front layer 31, a white layer 32, a black layer 33, and a back layer 34.

Figure 3A:
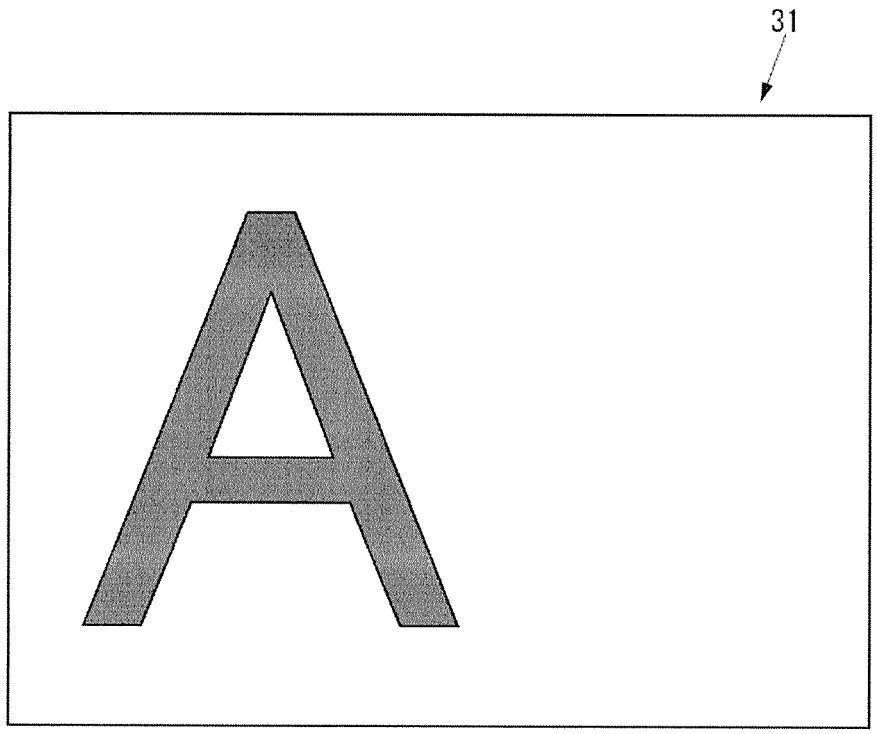
FIG. 3A is a plan view of a front layer illustrated in FIG. 2.
Figure 3B:
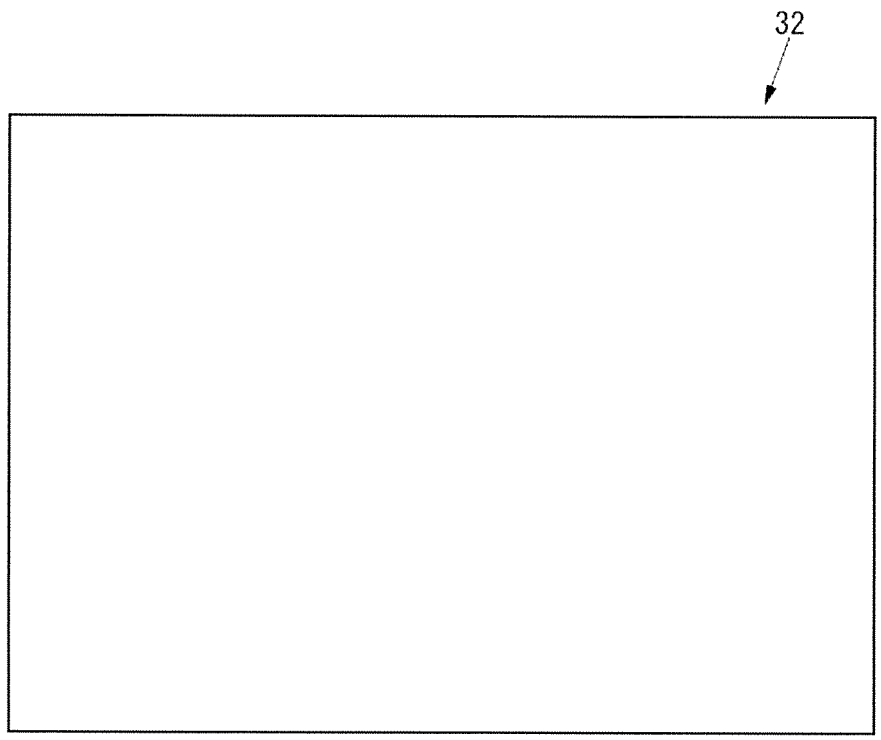
FIG. 3B is a plan view of a white layer illustrated in FIG. 2.
Figure 4A:
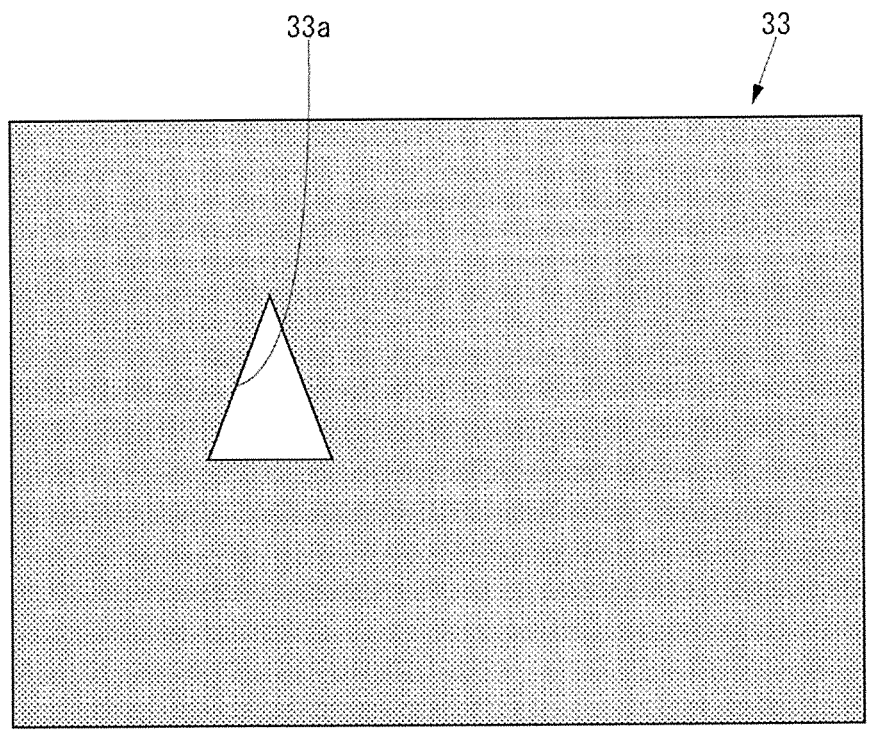
FIG. 4A is a plan view of a black layer illustrated in FIG. 2.
Figure 4B:
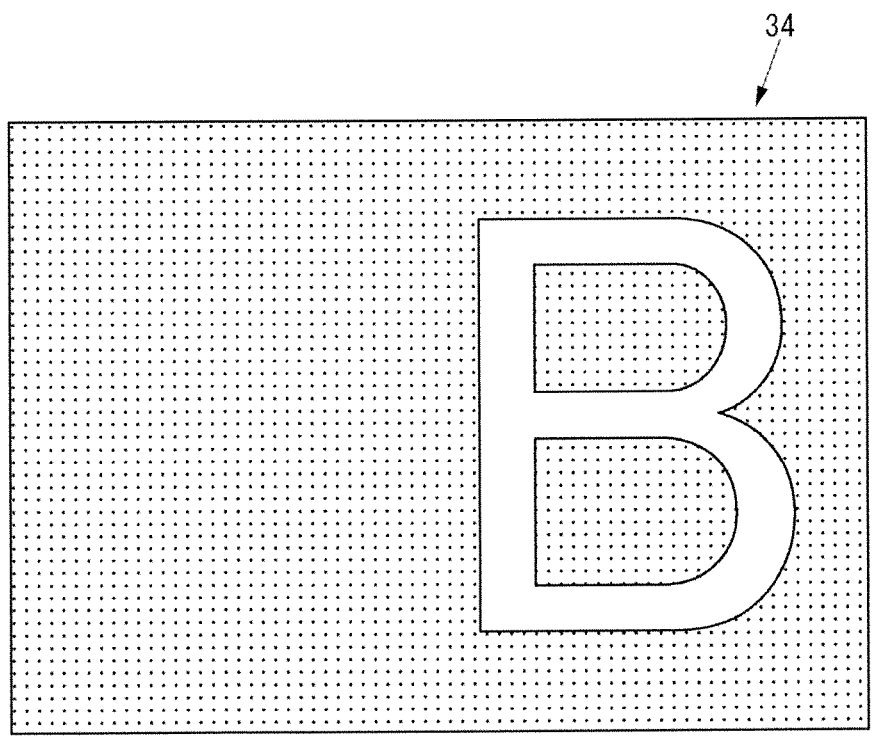
FIG. 4B is a plan view of a back layer illustrated in FIG. 2.

FIG. 3A is a plan view of the front layer 31. FIG. 3B is a plan view of the white layer 32. FIG. 4A is a plan view of the black layer 33. FIG. 4B is a plan view of the back layer 34.

The front layer 31 exhibits a pattern illustrated in FIG. 3A. The front layer 31 constitutes the first pattern print layer disclosed herein.

As illustrated in FIG. 2, the white layer 32 illustrated in FIG. 3B is interposed between the front layer 31 and the back layer 34 so as to conceal the back layer 34 to be invisible from the side of the front layer 31. Further, the white layer 32 reflects light from the side of the front layer 31 to allow the front layer 31 to be visible from the side of the front layer 31. The white layer 32 constitutes the first concealment print layer disclosed herein. The white layer 32 is printed with a white ink. Assuming that 100% represents the white ink being ejected to all of pixels targeted for printing on the medium 20, the white layer 32 is printed by, for example, 200%.

As illustrated in FIG. 2, the black layer 33 illustrated in FIG. 4A is interposed between the white layer 32 and the back layer 34 so as to conceal the back layer 34 to be invisible from the side of the front layer 31. The black layer 33 constitutes the second concealment print layer disclosed herein. The black layer 33 printed with a black ink exerts a higher light blocking effect than the white layer 32 printed with the white ink. As illustrated in FIG. 2, the black layer 33 includes a portion 33a where the black layer 33 is unformed for the front layer 31 in a layer-stacking direction indicated by arrow 10a. Assuming that 100% represents the black ink being ejected to all of pixels targeted for printing on the medium 20, the black layer 33 is printed by, for example, 30% to 70%. In comparison between the black layer 33 and the white layer 32 that are equal in thickness, the black layer 33 exerts a higher light blocking effect than the white layer 32.

The back layer 34 exhibits a pattern illustrated in FIG. 4B. The back layer 34 constitutes the second pattern print layer disclosed herein.

Next, a display device with the multilayered printed matter 10 set therein is hereinafter described.

Figure 5:
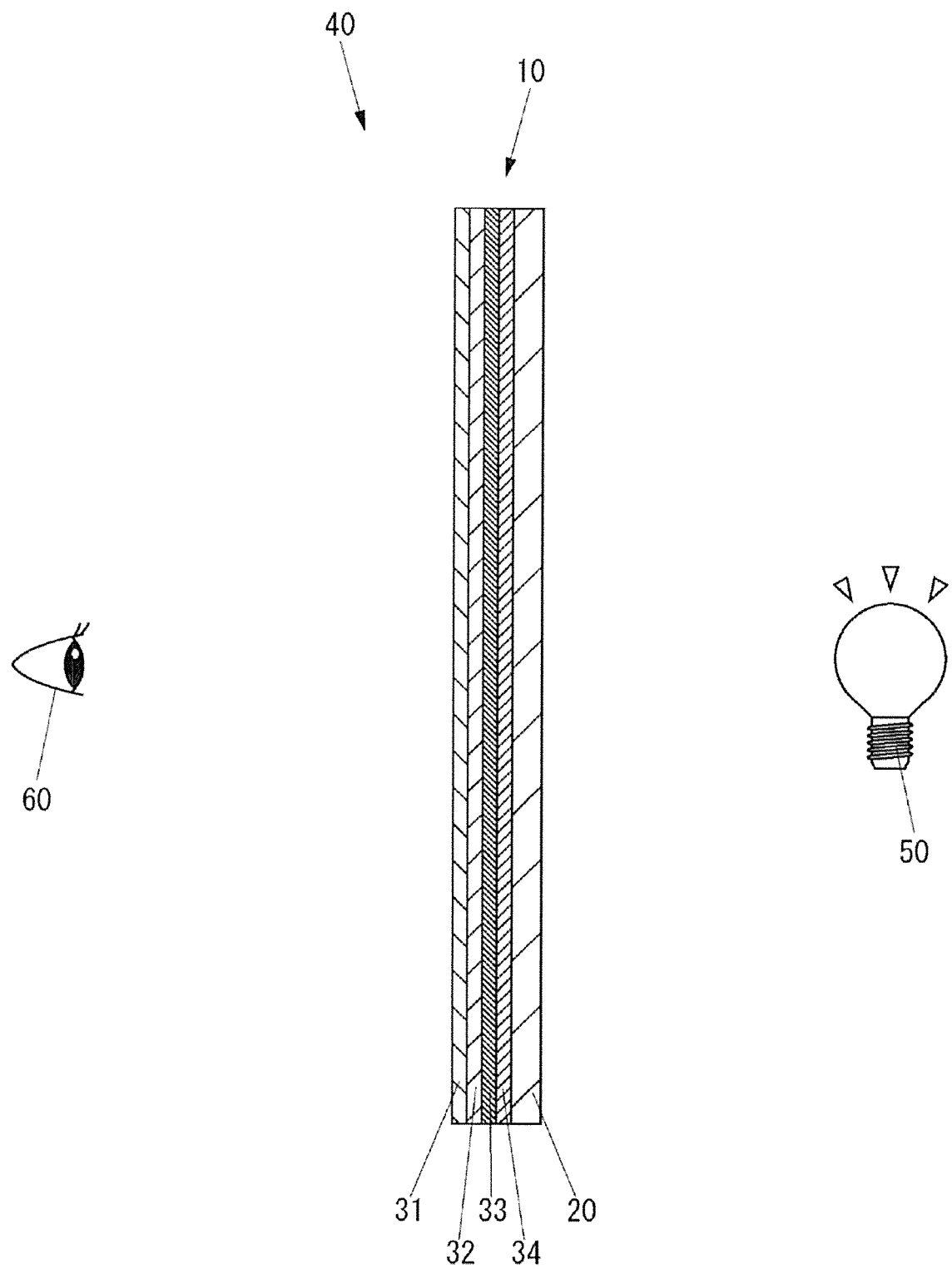
FIG. 5 is a side view of a display device with the multilayered printed matter of FIG. 1 set therein.

FIG. 5 is a side view of a display device 40 with the multilayered printed matter 10 set therein.

As illustrated in FIG. 5, the display device 40 includes the multilayered printed matter 10 and a light source 50. The light source 50 is disposed on the opposite side of the front layer 31 across the back layer 34 of the multilayered printed matter 10.

In the display device 40, the multilayered printed matter 10 is observed by a user 60 from the opposite side of the back layer 34 across the front layer 31 of the multilayered printed matter 10.

Next, the operation of the display device 40 is described.

When the multilayered printed matter 10 is under light coming from the side of the front layer 31, with no light from the light source 50 disposed on the side of the back layer 34, the user 60 sees the pattern on the front layer 31, as illustrated in FIG. 1.

Figure 6:
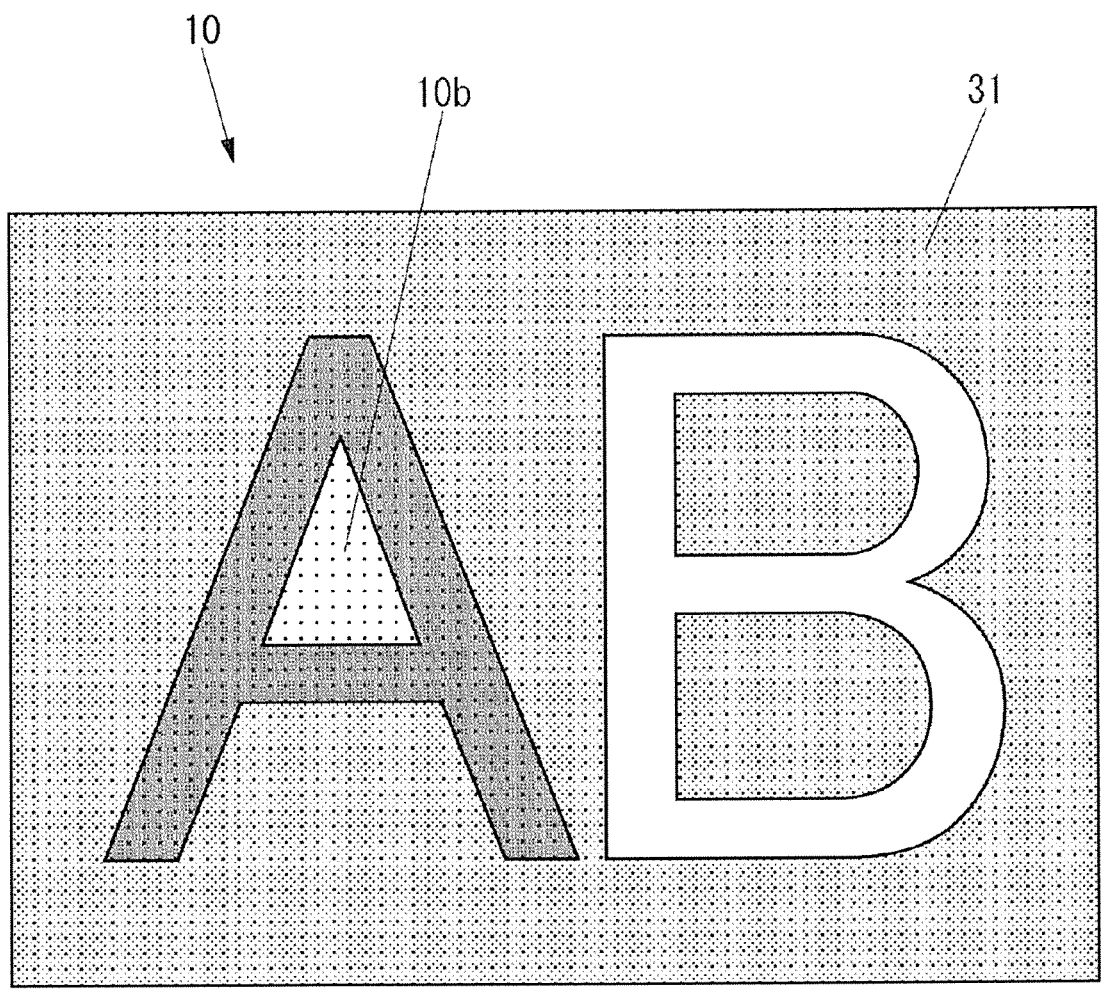
FIG. 6 is a plan view of the multilayered printed matter under light emitted from a light source illustrated in FIG. 5, with light from the side of the front layer being substantially blocked.

FIG. 6 is a plan view of the multilayered printed matter 10 under light emitted from the light source 50 on the side of the back layer 34, with light coming from the side of the front layer 31 being substantially blocked.

When the multilayered printed matter 10 is under light emitted from the light source 50 on the side of the back layer 34, with light coming from the side of the front layer 31 being substantially blocked, light from the light source 50 allows the pattern on the back layer 34 to be visible from the side of the front layer 31, as illustrated in FIG. 6. Thus, the user 60 sees a composite picture of the patterns on the front and back layers 31 and 34.

Next, a system for producing the multilayered printed matter 10 is hereinafter described.

Figure 7:
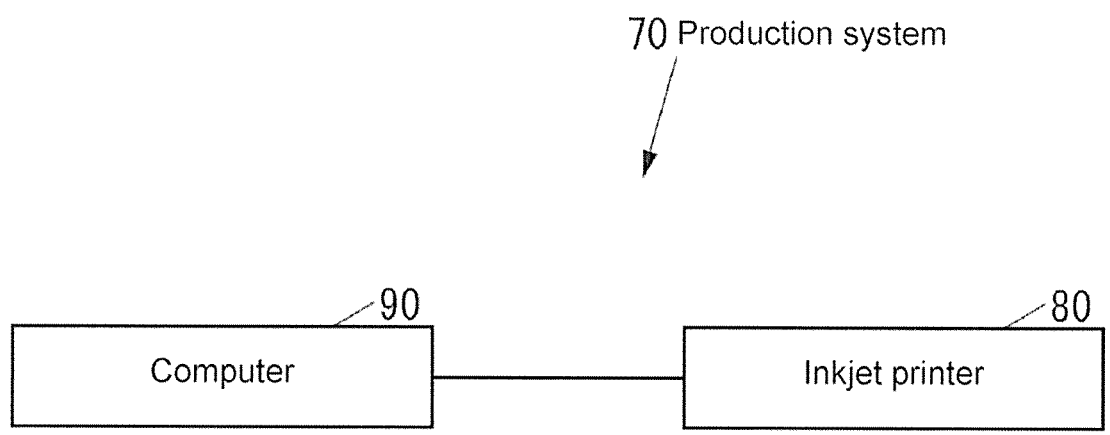
FIG. 7 is a block diagram of a system for producing the multilayered printed matter lustrated in FIG. 1.

FIG. 7 is a block diagram of a system 70 for producing the multilayered printed matter 10.

As illustrated in FIG. 7, the production system 70 includes an inkjet printer 80 that carries out printing for the medium 20 (see FIG. 2), and a computer 90, such as a PC (Personal Computer), programmed to transmit printing data to the inkjet printer 80.

The inkjet printer 80 may be a printer operable to carry out printing for the rolled medium 20, for example, UCJV-300 supplied by MIMAKI ENGINEERING CO., LTD, or may be selected from any other suitable inkjet printers.

Figure 8:
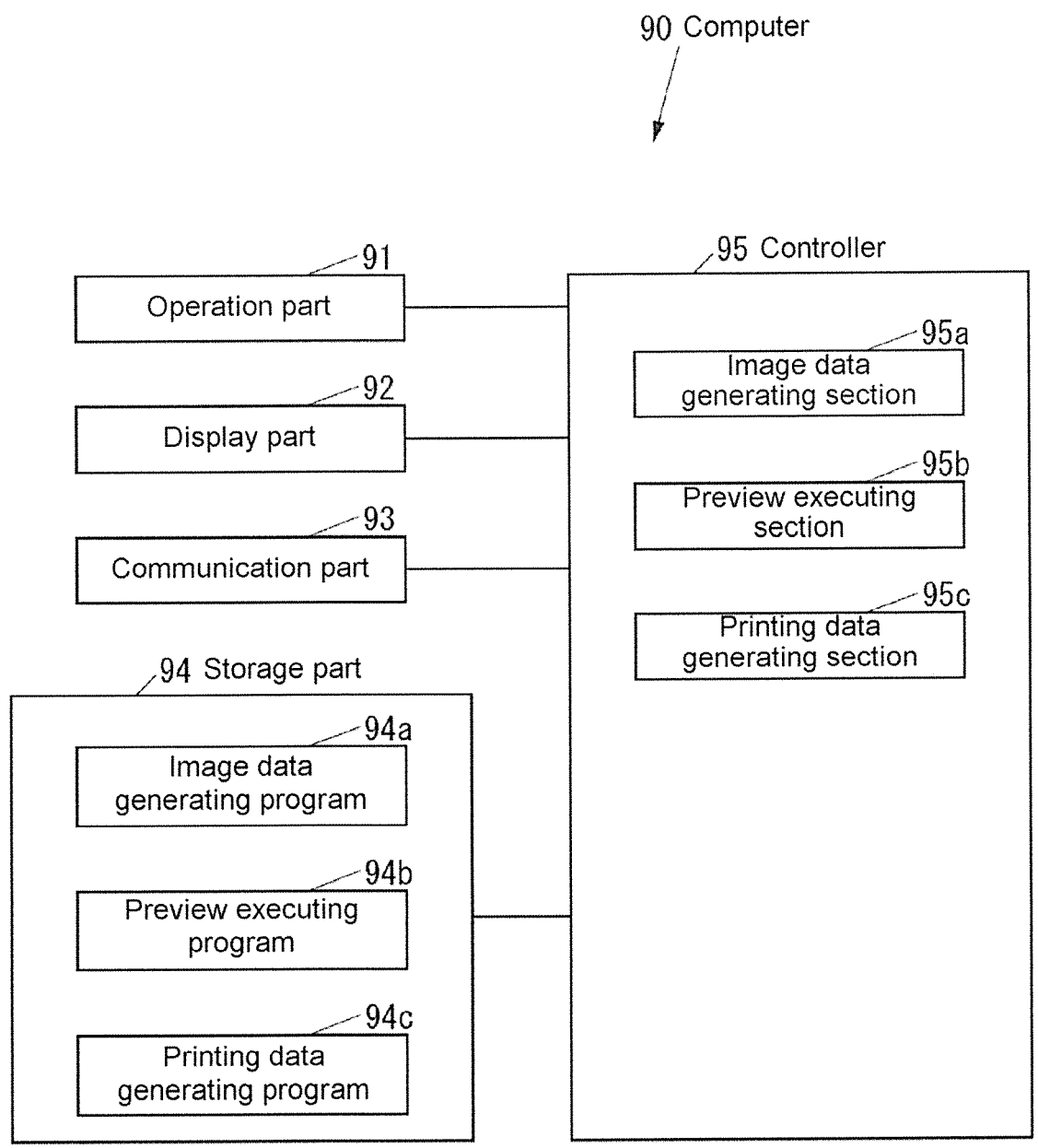
FIG. 8 is a block diagram of a computer illustrated in FIG. 7.

FIG. 8 is a block diagram of the computer 90.

Referring to FIG. 8, the computer 90 includes an operation part 91 that is an input device, such as a keyboard or a mouse, used to input various instructions, a display part 92 that is a display device, such as an LCD (Liquid Crystal Display) for display of various pieces of information, a communication part 93 that is a communication device communicating with external devices through a network such as a LAN (Local Area Network), or directly communicating with external devices wired or wirelessly not through the network, a storage part 94 that is a non-volatile storage device, such as a semiconductor memory or an HDD (Hard Disc Drive) storing various pieces of information, and a controller 95 that controls the whole computer 90.

The storage part 94 stores an image data generating program 94a for generating image data, a preview executing program 94b for executing the previewing of the multilayered printed matter, and a printing data generating program 94c for generating printing data. The image data generating program 94a, the preview executing program 94b, and the printing data generating program 94c may be installed into the computer 90 during the manufacture of this computer, may be installed as additional programs into the computer 90 in a later stage from an external storage medium such as a USB (Universal Serial Bus) memory, a CD (Compact Disk) or a DVD (Digital Versatile Disk), or may be installed as additional programs into the computer 90 in a later stage through a network.

The controller 95 includes a CPU (Central Processing Unit), a ROM (Read Only Memory) in which programs and various pieces of data are prestored, and a RAM (Random Access Memory) serving as a working region for the CPU. The CPU is configured to run the programs stored in the ROM or the storage part 94.

The controller 95 runs the image data generating program 94a and thereby effectuates an image data generating section 95a that generates pieces of image data respectively for the front layer 31, white layer 32, black layer 33, and back layer 34. The controller 95 runs the preview executing program 94b and thereby effectuates a preview executing section 95b that executes the previewing of the multilayered printed matter printed based on the pieces of image data generated by the image data generating section 95a. The controller 95 runs the printing data generating program 94c and thereby effectuates a printing data generating section 95c that generates printing data based on the image data generated by the image data generating section 95a.

Next is described a method for producing the multilayered printed matter 10, i.e., a multilayer printing method.

Figure 9:
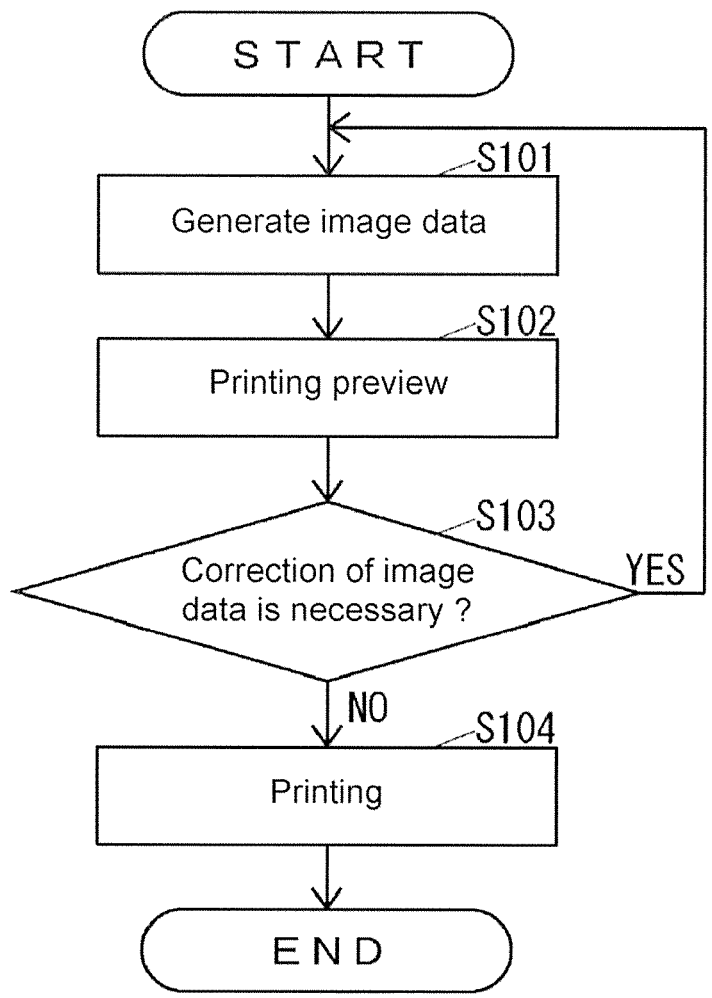
FIG. 9 is a flowchart of a method for producing the multilayered printed matter illustrated in FIG. 1.

FIG. 9 is a flowchart of the method for producing the multilayered printed matter 10.

Referring to FIG. 9, an operator runs the image data generating program 94a on the computer 90 and inputs via the operation part 91 instructions to generate the pieces of image data respectively for the front layer 31, white layer 32, black layer 33, and back layer 34 (S101). The image data generating section 95a accordingly generates the pieces of image data respectively for the front layer 31, white layer 32, black layer 33, and back layer 34 based on the instructions inputted via the operation part 91.

Subsequent to S101, the operator runs the preview executing program 94b on the computer 90 and inputs via the operation part 91 an instruction to execute the previewing of the multilayered printed matter printed based on the image data generated in S101 (S102). The preview executing section 95*b* accordingly executes the previewing of the multilayered printed matter printed based on the image data generated in S101.

Figure 10:
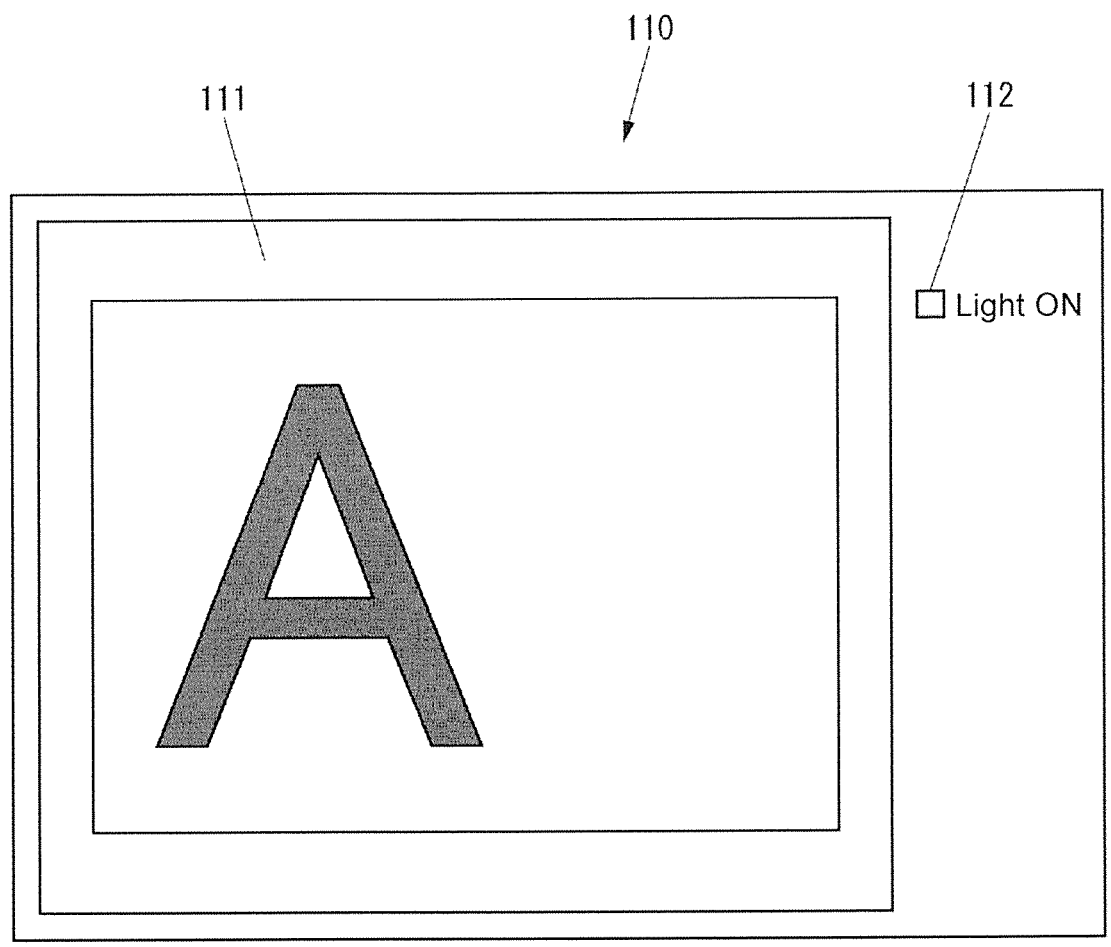
FIG. 10 is a drawing of an exemplified preview screen displayed by a preview executing means illustrated in FIG. 8.

FIG. 10 is a drawing of an exemplified preview screen 110 displayed by the preview executing section 95*b*.

The preview screen 110 illustrated in FIG. 10 includes a preview region 111 for displaying the preview of the multilayered printed matter printed based on the image data, and a check box 112 for selecting whether to display the preview of the multilayered printed matter printed based on the image data when this printed matter is set in the display device 40 illustrated in FIG. 5 and is illuminated with light emitted from the light source 50.

FIG. 10 shows the preview screen 110 with the check box 112 being unticked. On the preview region 111 of FIG. 10 is displayed the preview of the multilayered printed matter under light coming from the side of the front layer 31, with no light from the light source 50 disposed on the side of the back layer 34.

Figure 11:
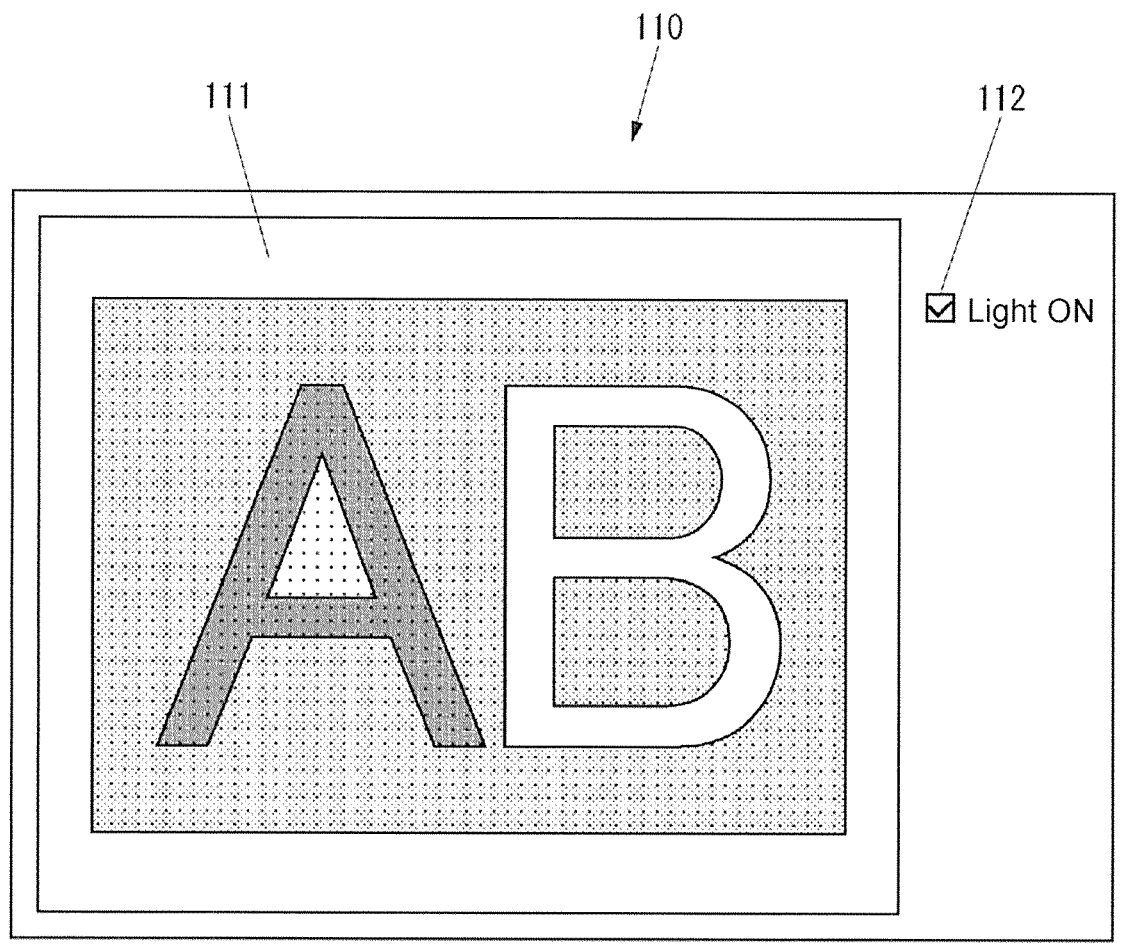
FIG. 11 is a drawing of an exemplified preview screen illustrated in FIG. 10 with a ticked check box.

FIG. 11 is a drawing of an example of the preview screen 110 on which the check box 112 is ticked.

FIG. 11 shows the preview screen 110 with the check box 112 being ticked. On the preview region 111 of FIG. 11 is displayed the preview of the multilayered printed matter under light emitted from the light source 50 disposed on the side of the back layer 34, with light coming from the side of the front layer 31 being substantially blocked.

Referring to FIG. 9, the operator determines whether to correct the image data based on the preview displayed in S102 (S103).

The operator, who determined in S103 that the image data needs to be corrected, returns to and performs S101.

The operator, who determined in S103 that the image data needs not be corrected, runs the printing data generating program 94*c* on the computer 90, and inputs via the operation part 91 printing instructions based on the image data generated in S101 (S104). The printing data generating section 95*c* accordingly generates printing data based on the image data generated in S101 and transmits the generated printing data to the inkjet printer 80. The inkjet printer 80 receives the printing data transmitted from the computer 90 and forms the group of print layers 30 on the medium 20 based on the received printing data. The inkjet printer 80 prints the back layer 34, black layer 33, white layer 32, and front layer 31 in this order on the medium 20 so as to produce the multilayered printed matter 10 illustrated in FIG. 5.

Figure 12:
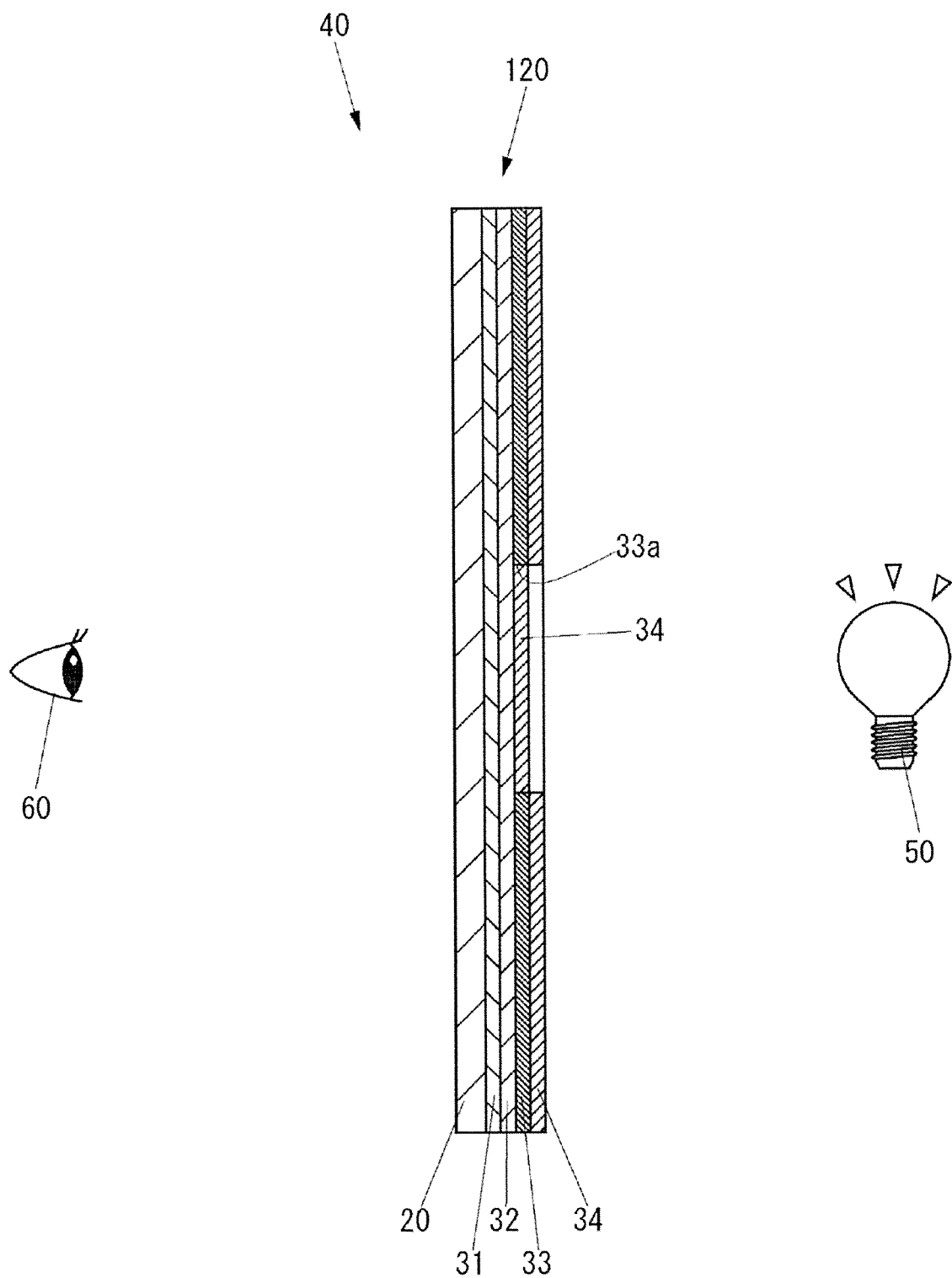
FIG. 12 is a side view of a display device with a multilayered printed matter set therein that is distinct from the multilayered printed matter illustrated in FIG. 1.

The inkjet printer 80 may produce a multilayered printed matter 120 illustrated in FIG. 12 by printing the front layer 31, white layer 32, black layer 33, and back layer 34 in this order on the medium 20.

Figure 13:
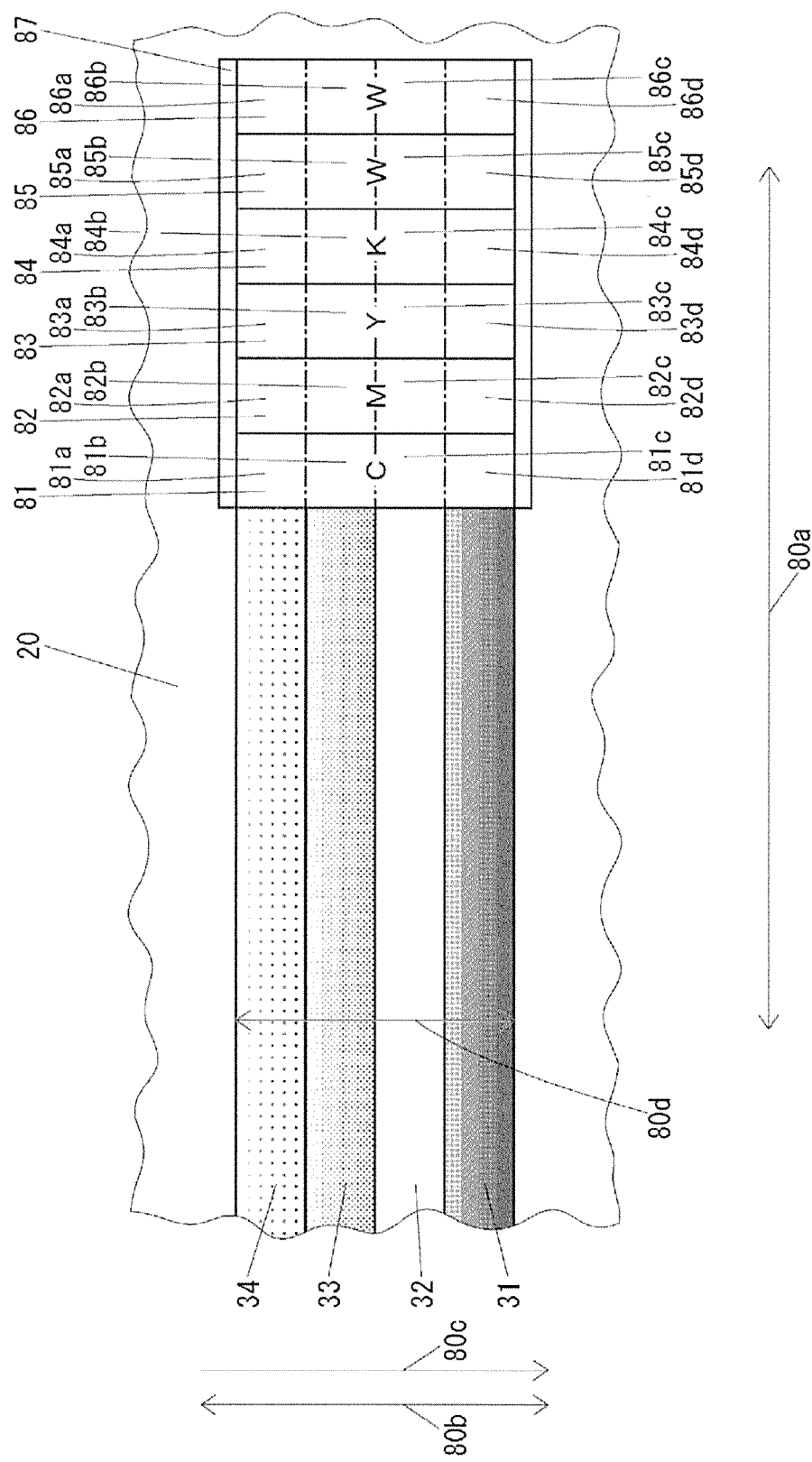
FIG. 13 is a drawing of a printing method for printing the front layer, white layer, black layer, and back layer using an inkjet printer illustrated in FIG. 7.

FIG. 13 is a drawing of a printing method for printing the front layer 31, white layer 32, black layer 33, and back layer 34 using an example of the inkjet printer 80.

The inkjet printer 80 illustrated in FIG. 13 has inkjet heads 81 to 86 configured to eject inks. The inkjet heads 81 to 86 are serial scan heads for inkjet printing. The colors of inks ejected from the inkjet heads 81 to 86 are respectively cyan, magenta, yellow, black, white, and white.

The front layer 31 and the back layer 34 are mostly printed with the inks ejected from the inkjet heads 81 to 84. The white layer 32 is printed with the inks ejected from the inkjet heads 85 and 86. The black layer 33 is printed with the ink ejected from the inkjet head 84.

The inkjet heads 81 to 86 are mounted in a carriage 87 and are moved relative to the medium 20 as the carriage 87 is moved relative to the medium 20.

The inkjet printer 80 illustrated in FIG. 13 ejects the inks to the medium 20 from the inkjet heads 81 to 86 during relative movement of the medium 20 or the group of inkjet heads 81 to 86 to the other in a main scanning direction indicated by arrow 80*a*.

For the ejection of the inks to the medium 20 from the inkjet heads 81 to 86 of the inkjet printer 80 illustrated in FIG. 13, a region targeted for ink ejection is divided into four quarters and further divided into the following regions per quarter, respectively for the inkjet heads 81 to 86, from an upstream side toward a downstream side in a direction of arrow 80*c* included in a sub scanning direction indicated by arrow 80*b* orthogonal to the main scanning direction; regions 81*a*, 82*a*, 83*a*, 84*a*, 85*a*, and 86*a* for printing the back layer 34, regions 81*b*, 82*b*, 83*b*, 84*b*, 85*b*, and 86*b* for printing the black layer 33, regions 81*c*, 82*c*, 83*c*, 84*c*, 85*c*, and 86*c* for printing the white layer 32, and regions 81*d*, 82*d*, 83*d*, 84*d*, 85*ad*, and 86*d* for printing the front layer 31.

Because the white layer 32 is printed with the inks ejected from the inkjet heads 85 and 86 as described earlier, the regions 81*c*, 82*c*, 83*c* and 84*c* are, in fact, left unused. Similarly, the regions 81*b*, 82*b*, 83*b*, 85*b*, and 86*b* are, in fact, left unused because the black layer 33 is printed with the ink ejected from the inkjet head 84.

The regions 81*d*, 82*d*, 83*d*, and 84*d* for the inkjet heads 81 to 84 are regions to be printed by the first head disclosed herein. The regions 85*c* and 86*c* for the inkjet heads 85 and 86 are regions to be printed by the second head disclosed herein. The region 84*b* for the inkjet head 84 is a region to be printed by the third head disclosed herein. The regions 81*a*, 82*a*, 83*a*, and 84*a* for the inkjet heads 81 to 84 are regions to be printed by the fourth head disclosed herein. The regions, 81*d*, 82*d*, 83*d*, and 84*d*, regions 85*c* and 86*c*, region 84*b*, and regions 81*a*, 82*a*, 83*a*, and 84*a* are arranged in this order in a direction opposite to the direction of arrow 80*c*, i.e., from the upstream side toward the downstream side in the certain direction.

The inkjet printer 80 of FIG. 13 produces the multilayered printed matter 10 illustrated in FIG. 5 by, for example, moving the medium 20 in the direction of arrow 80*c* relative to the inkjet heads 81 to 86 by a length corresponding to one-sixteenth of a length 80*d* of the ink-ejection region in the sub scanning direction upon completion of each printing cycle using the inkjet heads 81 to 86 in the main scanning direction.

In the inkjet printer 80 of FIG. 13 that moves the medium 20 relative to the inkjet heads 81 to 86 in the direction of arrow 80*c* by a length corresponding to one-sixteenth of the length 80*d* upon completion of each printing cycle using the inkjet heads 81 to 86 in the main scanning direction, optional portions of the front layer 31, white layer 32, black layer 33, and back layer 34 are respectively printed by the inkjet heads 81 to 86 in four printing cycles, i.e., in four passes, in the main scanning direction. In the multilayered printed matter 10, therefore, the inkjet printer 80 illustrated in FIG. 13 finishes the printing of optional portions of the respective layers in 16 passes. However, any number of passes but four passes may be set in the inkjet printer 80 of FIG. 13 to finish the printing of optional portions of the front layer 31, white layer 32, black layer 33, and back layer 34.

The inkjet printer 80 of FIG. 13 produces the multilayered printed matter 120 illustrated in FIG. 12 by, for example, moving the medium 20 in the direction opposite to the direction of arrow 80*c* relative to the inkjet heads 81 to 86 by a length corresponding to one-sixteenth of the length 80*d* upon completion of each printing cycle using the inkjet heads 81 to 86 in the main scanning direction.

Figure 14:
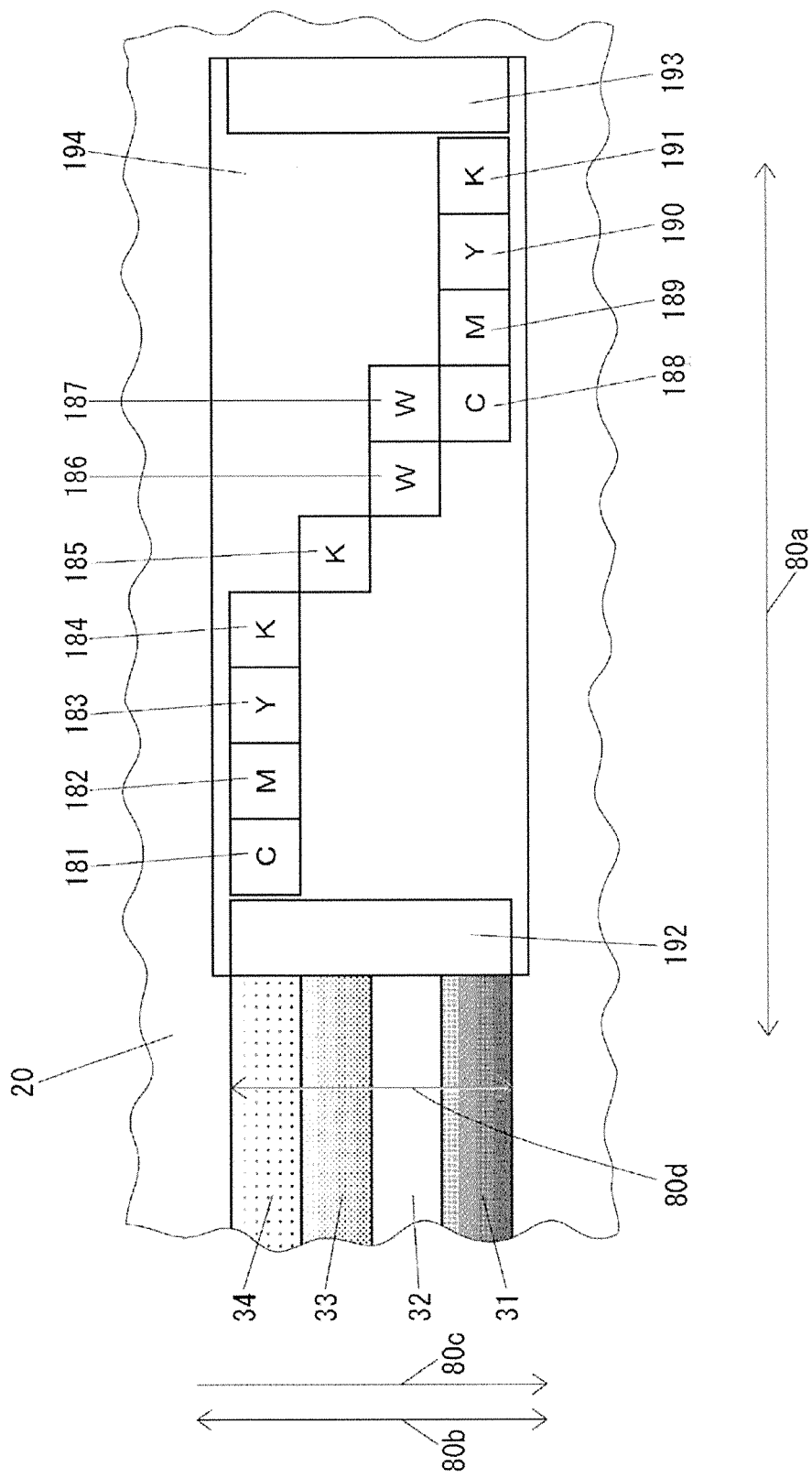
FIG. 14 is a drawing of another printing method, which is distinct from the printing method of FIG. 13, for printing the front layer, white layer, black layer, and back layer using the inkjet printer illustrated in FIG. 7.

FIG. 14 is a drawing of another printing method, which is distinct from the example of FIG. 13, for printing the front layer 31, white layer 32, black layer 33, and back layer 34 using an example of the inkjet printer 80.

The inkjet printer 80 illustrated in FIG. 14 has inkjet heads 181 to 191 configured to eject inks. The inkjet heads 181 to 191 are serial scan heads for inkjet printing. The colors of inks ejected from the inkjet heads 181 to 191 are respectively cyan, magenta, yellow, black, black, white, white, cyan, magenta, yellow, and black. The inks ejected from the inkjet heads 181 to 191 are UV inks curable by ultraviolet irradiation.

The inkjet printer 80 of FIG. 14 further has ultraviolet irradiators 192 and 193 that irradiate the inks ejected from the inkjet heads 181 to 191 with ultraviolet light. The ultraviolet irradiator 192 and 193 are disposed at two positions spaced apart across the inkjet heads 181 to 191 interposed therebetween in the main scanning direction of arrow 80a.

The back layer 34 is printed with the inks ejected from the inkjet heads 181 to 184. The black layer 33 is printed with the ink ejected from the inkjet head 185. The white layer 32 is printed with the inks ejected from the inkjet heads 186 and 187. The front layer 31 is printed with the inks ejected from the inkjet heads 188 to 191.

The inkjet heads 188 to 191 constitute the first head disclosed herein. The inkjet heads 186 and 187 constitute the second head disclosed herein. The inkjet head 185 constitutes the third head disclosed herein. The inkjet heads 181 to 184 constitute the fourth head disclosed herein. The inkjet heads 188 to 191, inkjet heads 186 and 187, inkjet head 185, and inkjet heads 181 to 184 are arranged in this order in the direction opposite to the direction of arrow 80c, i.e., from the upstream side toward the downstream side in the certain direction.

The inkjet heads 181 to 191 and the ultraviolet irradiators 192 and 193 are mounted in a carriage 194 and are moved relative to the medium 20 as the carriage 194 is moved relative to the medium 20.

The method for producing the multilayered printed matter 10, 120 using the inkjet printer 80 illustrated in FIG. 14 is essentially similar to the method for producing the multilayered printed matter 10, 120 using the inkjet printer 80 illustrated in FIG. 13. In the inkjet printer 80 of FIG. 14, the inks ejected from the inkjet heads 181 to 191 that just landed on the medium 20 are immediately irradiated to be cured with ultraviolet light emitted from one of the ultraviolet irradiators 192 and 193 on the upstream side in the direction of relative movement of the carriage 194 to the medium 20 in the main scanning direction.

Figure 15:
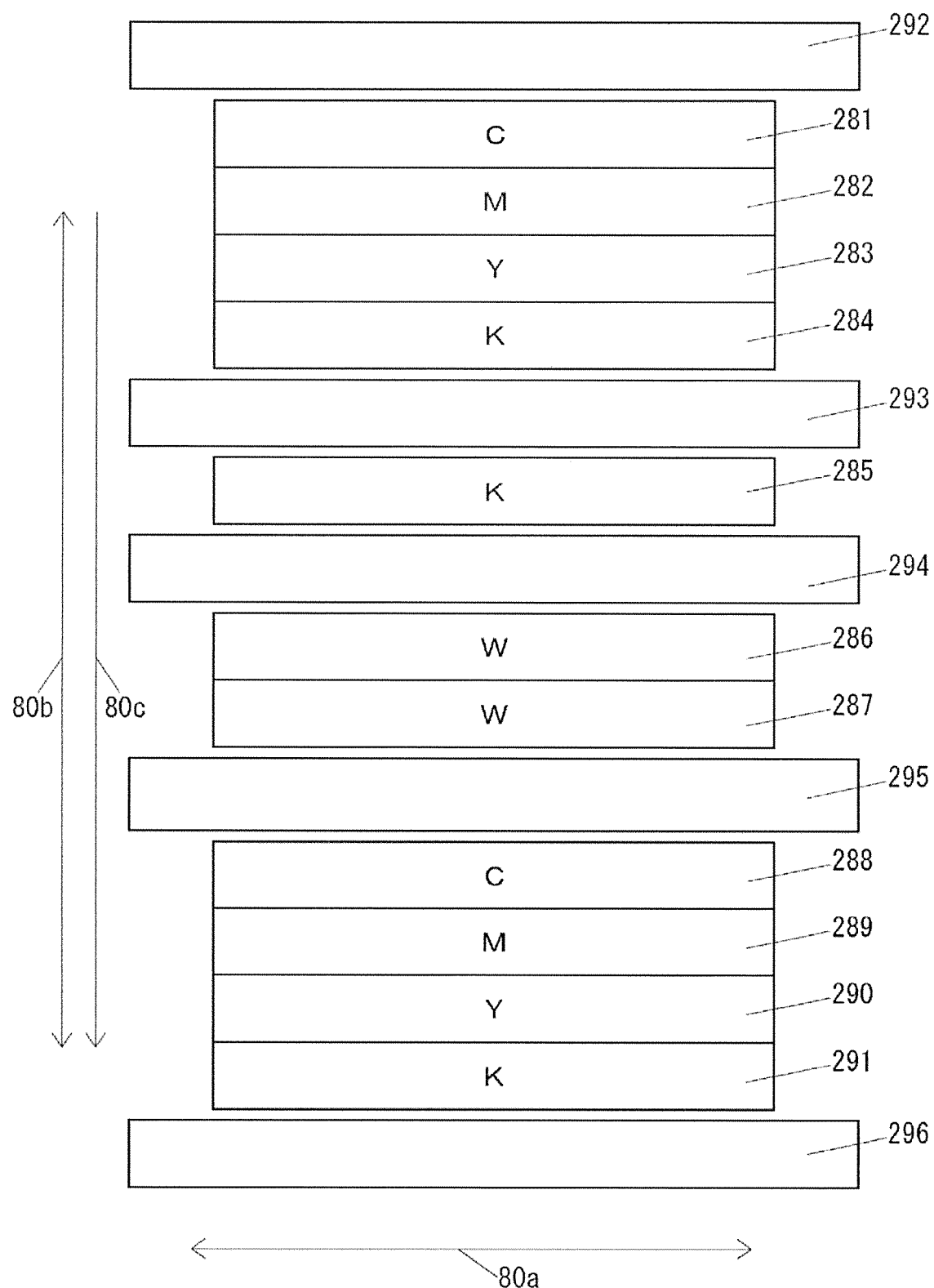
FIG. 15 is a drawing of yet another printing method, which is distinct from the printing methods of FIGS. 13 and 14, for printing the front layer, white layer, black layer, and back layer using the inkjet printer illustrated in FIG. 7.

FIG. 15 is a drawing of yet another printing method, which is distinct from the examples of FIGS. 13 and 14, for printing the front layer 31, white layer 32, black layer 33, and back layer 34 using an example of the inkjet printer 80.

The inkjet printer 80 illustrated in FIG. 15 has inkjet heads 281 to 291 configured to eject inks. The inkjet heads 281 to 291 are line scan heads for inkjet printing. The colors of inks ejected from the inkjet heads 281 to 291 are respectively cyan, magenta, yellow, black, black, white, white, cyan, magenta, yellow, and black. The inks ejected from the inkjet heads 281 to 291 are UV inks curable by ultraviolet irradiation.

The inkjet printer 80 of FIG. 15 further has ultraviolet irradiators 292 to 296 that irradiate the inks ejected from the inkjet heads 281 to 291 with ultraviolet light. The ultraviolet irradiators 292 and 293 are spaced apart in the direction of arrow 80b across the inkjet heads 281 to 284 interposed therebetween. The ultraviolet irradiators 293 and 294 are spaced apart in the direction of arrow 80b across the inkjet head 285 interposed therebetween. The ultraviolet irradiators 294 and 295 are spaced apart in the direction of arrow 80b across the inkjet heads 286 and 287 interposed therebetween. The ultraviolet irradiators 295 and 296 are spaced apart in the direction of arrow 80b across the inkjet heads 288 to 291 interposed therebetween.

The back layer 34 is printed with the inks ejected from the inkjet heads 281 to 284. The black layer 33 is printed with the ink ejected from the inkjet head 285. The white layer 32 is printed with the inks ejected from the inkjet heads 286 and 287. The front layer 31 is printed with the inks ejected from the inkjet heads 288 to 291.

The inkjet heads 288 to 291 constitute the first head disclosed herein. The inkjet heads 286 and 287 constitute the second head disclosed herein. The inkjet head 285 constitutes the third head disclosed herein. The inkjet heads 281 to 284 constitute the fourth head disclosed herein. The inkjet heads 288 to 291, inkjet heads 286 and 287, inkjet head 285, and inkjet heads 281 to 284 are arranged in this order in the direction opposite to the direction of arrow 80c, i.e., from the upstream side toward the downstream side in the certain direction.

Relative positions of the inkjet heads 281 to 291 and the ultraviolet irradiators 292 to 296 remain unchanged.

In the operation to produce the multilayered printed matter 10, the inkjet printer 80 illustrated in FIG. 15 ejects the inks to the medium 20 from the inkjet heads 281 to 291 during relative movement of the medium 20 to the inkjet heads 281 to 291 and the ultraviolet irradiators 292 to 296 in the direction of arrow 80c. In the operation to produce the multilayered printed matter 10, the inkjet printer 80 illustrated in FIG. 15 irradiates the inks ejected from the inkjet heads 281 to 284, inkjet head 285, inkjet heads 286 and 287, and inkjet heads 288 to 291 with ultraviolet light emitted from the ultraviolet irradiators 293, 294, 295, and 296 immediately after the inks landed on the medium 20.

In the operation to produce the multilayered printed matter 120, the inkjet printer 80 illustrated in FIG. 15 ejects the inks to the medium 20 from the inkjet heads 281 to 291 during relative movement of the medium 20 to the inkjet heads 281 to 291 and the ultraviolet irradiators 292 to 296 in the direction opposite to the direction of arrow 80c. In the operation to produce the multilayered printed matter 120, the inkjet printer 80 illustrated in FIG. 15 irradiates the inks ejected from the inkjet heads 281 to 284, inkjet head 285, inkjet heads 286 and 287, and inkjet heads 288 to 291 with ultraviolet light emitted from the ultraviolet irradiators 292, 293, 294, and 295 immediately after the inks landed on the medium 20.

The front layer 31, white layer 32, black layer 33, and back layer 34 may be printed by the inkjet printer 80 according to any suitable means but the examples illustrated in FIGS. 13 to 15.

So far was described the method for producing the multilayered printed matter in which a group of print layers are formed on the medium 20 by the inkjet printer 80 based on the printing data generated by the computer 90. The multilayered printed matter thus formed may be cut away from any parts but this printed matter on the medium 20 with a cutting plotter. Hereinafter is described other production methods for the multilayered printed matter, in which the multilayered printed matter obtained by forming a group of print layers on the medium 20 using the inkjet printer 80 is cut away from any parts but this printed matter on the medium 20 with a cutting plotter.

The description starts with a production method for the multilayered printed matter in which the inkjet printer 80 equipped with the function of a cutting plotter carries out the printing and cutting both.

Figure 16:
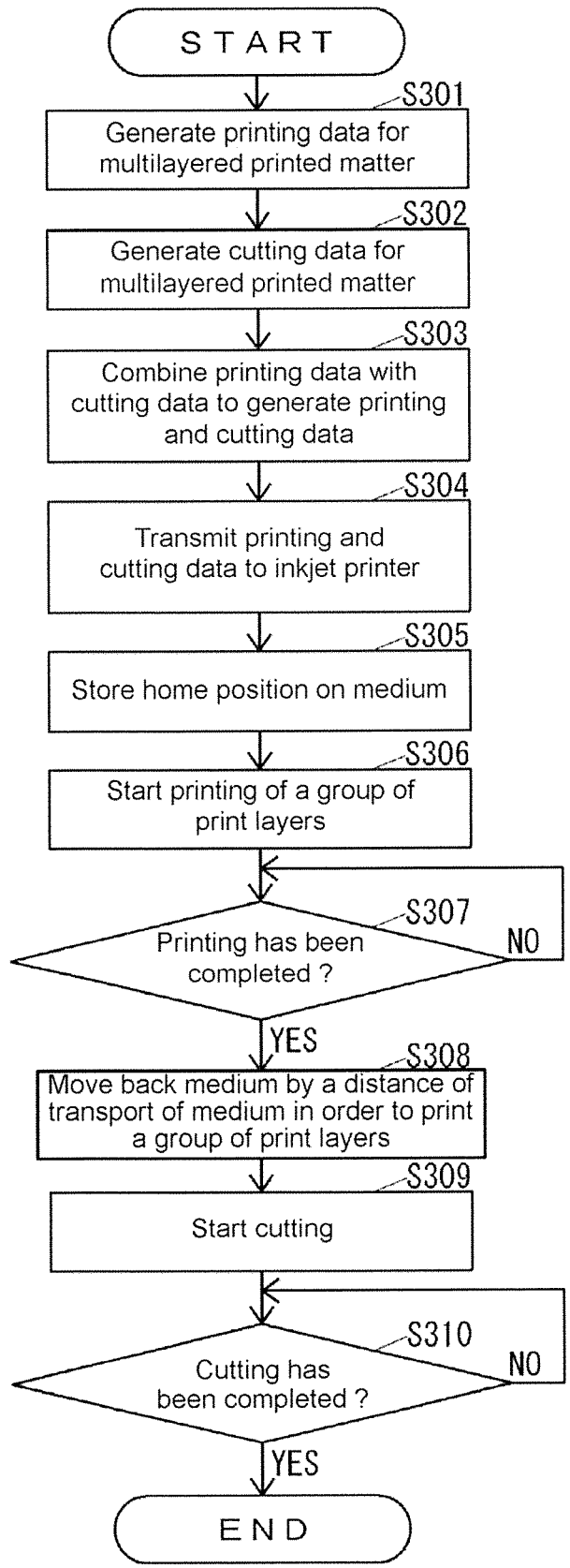
FIG. 16 is a flowchart of a method for producing the multilayered printed matter in which no register mark is used in case the printing and cutting are both carried out by the inkjet printer illustrated in FIG. 7.

FIG. 16 is a flowchart of a method for producing the multilayered printed matter when no register mark for positioning during cutting is used in case the printing and cutting are both carried out by the inkjet printer 80.

Referring to FIG. 16, the operator prompts the computer 90 to generate printing data for the multilayered printed matter (S301) and then prompts the computer 90 to generate cutting data for the multilayered printed matter in accordance with the printing data generated in S301 (S302). Next, the operator prompts the computer 90 to combine the printing data generated in S301 with the cutting data generated in S302 so as to generate printing and cutting data (S303). Then, the operator prompts the computer 90 to transmit the printing and cutting data generated in S303 to the inkjet printer 80 (S304).

The inkjet printer 80 receives the printing and cutting data transmitted in S304 from the computer 90 and correspondingly stores a home position on the medium 20 (S305).

The inkjet printer 80 starts to print the group of print layers on the medium 20 based on the printing data included in the printing and cutting data (S306), and continues to determine whether the printing of the group of layers on the medium 20 is completed until the completion is confirmed (S307).

When it is determined in S307 by the inkjet printer 80 that all of the group of print layers have been printed on the medium 20, the medium 20 is moved based on the home position stored in S305 so as to move back by a distance of transport of the medium 20 in order to print the group of print layers (S308).

Then, the inkjet printer 80 starts to cut the medium 20 using the function of the cutting plotter based on the cutting data included in the printing and cutting data (S309), and continues to determine whether the cutting based on the cutting data is completed until the completion is confirmed (S310).

When it is determined in S310 by the inkjet printer 80 that the cutting based on the cutting data has been completed, the multilayered printed matter is cut away from any parts but this printed matter on the medium 20 and obtained as a product.

Figure 17:
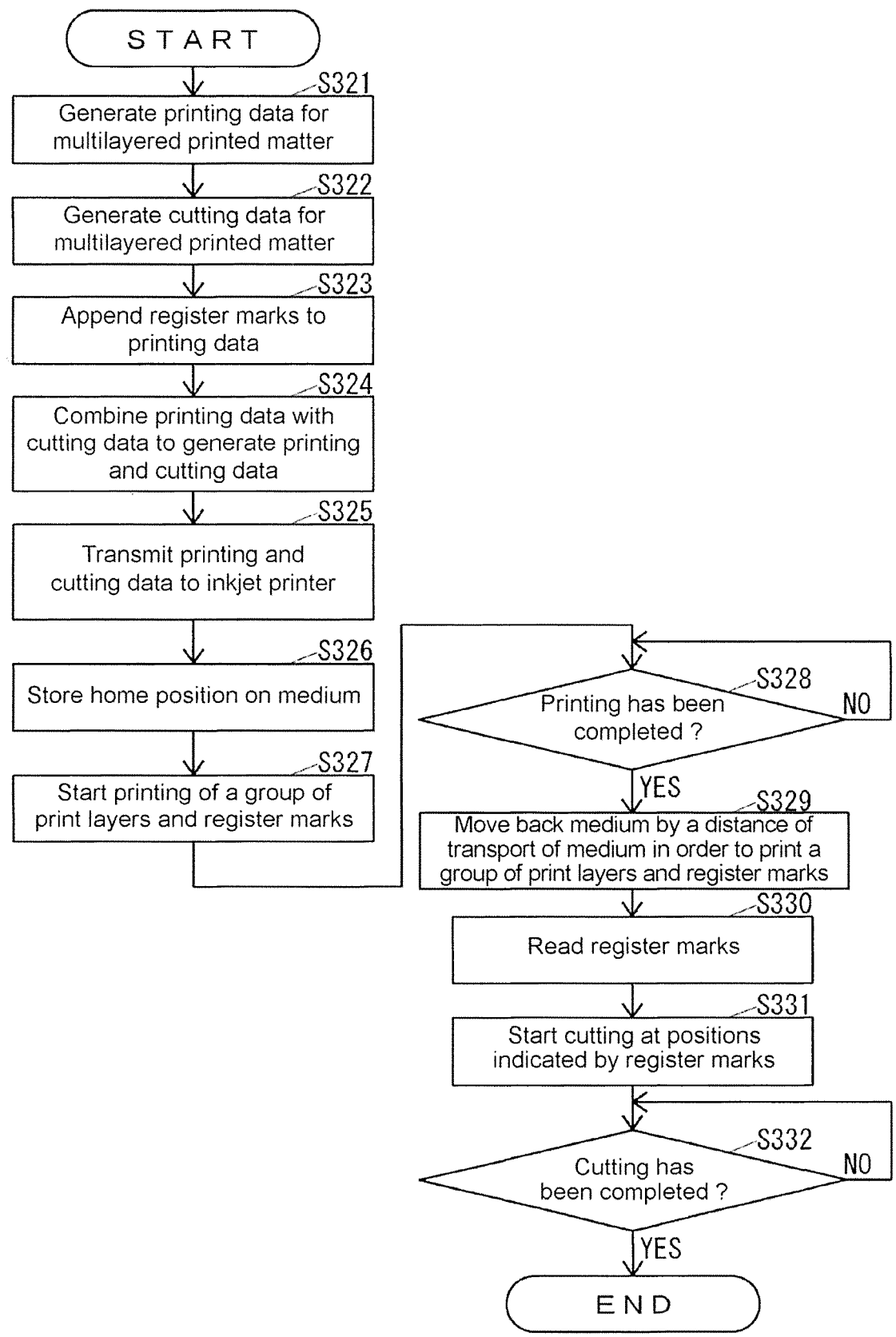
FIG. 17 is a flowchart of a method for producing the multilayered printed matter in which register marks are used in case the printing and cutting are both carried out by the inkjet printer illustrated in FIG. 7.

FIG. 17 is a flowchart of a method for producing the multilayered printed matter in which register marks are used in case the printing and cutting are both carried out by the inkjet printer 80.

Referring to FIG. 17, the operator prompts the computer 90 to generate printing data for the multilayered printed matter (S321) and then prompts the computer 90 to generate cutting data for the multilayered printed matter in accordance with the printing data generated in S321 (S322). Next, the operator prompts the computer 90 to append register marks that accord with the cutting data generated in S322 to the printing data generated in S321 (S323). Then, the operator prompts the computer 90 to combine the printing data with the register marks appended thereto in S323 with the cutting data generated in S322 so as to generate printing and cutting data (S324). Then, the operator prompts the computer 90 to transmit the printing and cutting data generated in S324 to the inkjet printer 80 (S325).

The inkjet printer 80 receives the printing and cutting data transmitted in S325 from the computer 90 and correspondingly stores a home position on the medium 20 (S326).

The inkjet printer 80 starts to print the group of print layers and the register marks on the medium 20 based on the printing data included in the printing and cutting data (S327), and continues to determine whether the printing of the group of layers and the register marks on the medium 20 is completed until the completion is confirmed (S328).

When it is determined in S328 by the inkjet printer 80 that all of the group of print layers and the register marks have been printed on the medium 20, the medium 20 is moved based on the home position stored in S326 so as to move back by a distance of transport of the medium 20 in order to print the group of print layers and the register marks (S329).

The inkjet printer 80 reads the register marks printed on the medium 20 (S330) and starts to cut the medium 20 at positions indicated by the register marks read in S330 using the function of the cutting plotter based on the cutting data included in the printing and cutting data (S331), and continues to determine whether the cutting based on the cutting data is completed until the completion is confirmed (S332).

When it is determined in S332 by the inkjet printer 80 that the cutting based on the cutting data has been completed, the multilayered printed matter is cut away from any parts but this printed matter on the medium 20 and obtained as a product.

Next is described a production method for the multilayered printed matter in which a cutting plotter independent of the inkjet printer 80 is used for cutting after the printing by the inkjet printer 80 is over.

Figure 18:
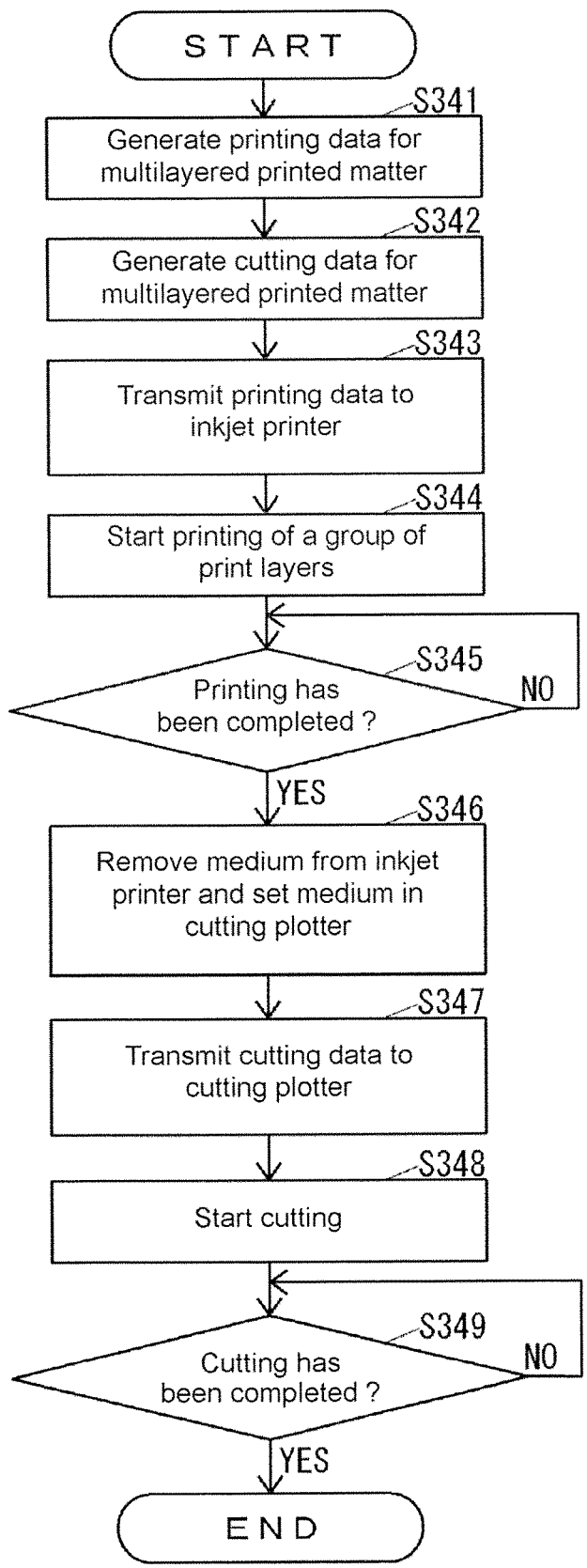
FIG. 18 is a flowchart of a method for producing the multilayered printed matter in which no register mark is used in case the cutting is carried out by a cutting plotter independent of the inkjet printer subsequent to the printing by the inkjet printer illustrated in FIG. 7.

FIG. 18 is a flowchart of a method for producing the multilayered printed matter in which no register mark is used in case the cutting is carried out by a cutting plotter independent of the inkjet printer 80 subsequent to the printing by the inkjet printer 80.

Referring to FIG. 18, the operator prompts the computer 90 to generate printing data for the multilayered printed matter (S341) and then prompts the computer 90 to generate cutting data for the multilayered printed matter in accordance with the printing data generated in S341 (S342). Then, the operator prompts the computer 90 to transmit the printing data generated in S341 to the inkjet printer 80 (S343).

The inkjet printer 80 receives the printing data transmitted in S343 from the computer 90 and then starts to print the group of print layers on the medium 20 based on the received printing data (S344), and continues to determine whether the printing of the group of layers on the medium 20 is completed until the completion is confirmed (S345).

When it is determined in S345 by the inkjet printer 80 that all of the group of print layers have been printed on the medium 20, the operator removes the medium 20 with the group of print layers printed thereon by the inkjet printer 80 from the inkjet printer 80 and then sets the medium 20 in a cutting plotter independent of the inkjet printer 80 (S346). At the time, the medium 20 is aligned and set in the cutting plotter by the operator, so that the home position on the medium 20 matches a certain position in the cutting plotter.

Then, the operator prompts the computer 90 to transmit the cutting data generated in S342 to the cutting plotter (S347).

The cutting plotter receives the cutting data transmitted in S347 from the computer 90 and then starts to cut the medium 20 based on the received cutting data (S348), and continues to determine whether the cutting based on the cutting data is completed until the completion is confirmed (S349).

When it is determined in S349 by the cutting plotter that the cutting based on the cutting data has been completed, the multilayered printed matter is cut away from any parts but this printed matter on the medium 20 and obtained as a product.

Figure 19:
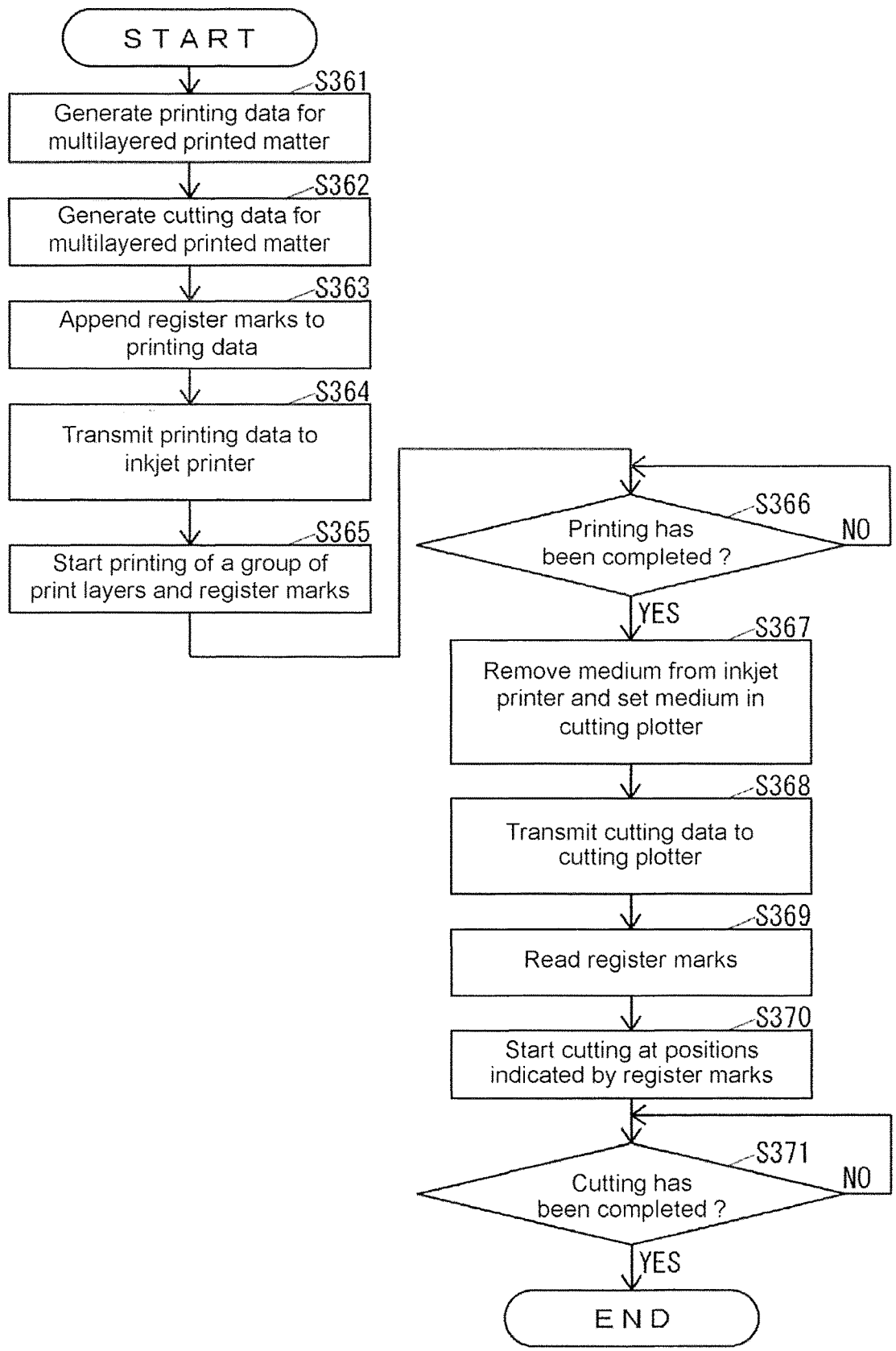
FIG. 19 is a flowchart of a method for producing the multilayered printed matter in which register marks are used in case the cutting is carried out by a cutting plotter independent of the inkjet printer subsequent to the printing by the inkjet printer illustrated in FIG. 7.

FIG. 19 is a flowchart of a method for producing the multilayered printed matter in which register marks are used in case the cutting is carried out by a cutting plotter independent of the inkjet printer 80 subsequent to the printing by the inkjet printer 80.

Referring to FIG. 19, the operator prompts the computer 90 to generate printing data for the multilayered printed matter (S361) and then prompts the computer 90 to generate cutting data for the multilayered printed matter in accordance with the printing data generated in S361 (S362). Next, the operator prompts the computer 90 to append register marks that accord with the cutting data generated in S362 to the printing data generated in S361 (S363). Then, the operator prompts the computer 90 to transmit the printing data with the register marks appended thereto in S363 to the inkjet printer 80 (S364).

The inkjet printer 80 receives the printing data transmitted in S364 from the computer 90 and then starts to print the group of print layers and the register marks on the medium 20 based on the received printing data (S365), and continues to determine whether the printing of the group of layers and the register marks on the medium 20 is completed until the completion is confirmed (S366).

When it is determined in S366 by the inkjet printer 80 that all of the group of print layers and the register marks have been printed on the medium 20, the operator removes the medium 20 with the group of print layers and the register marks printed thereon by the inkjet printer 80 from the inkjet printer 80 and then sets the medium 20 in a cutting plotter independent of the inkjet printer 80 (S367). At the time, the medium 20 is aligned and set in the cutting plotter by the operator, so that the home position on the medium 20 matches a certain position in the cutting plotter.

Then, the operator prompts the computer 90 to transmit the cutting data generated in S362 to the cutting plotter (S368).

The cutting plotter reads the register marks printed on the medium 20 (S369) and starts to cut the medium 20 at positions indicated by the register marks read in S369 based on the received cutting data (S370), and continues to determine whether the cutting based on the cutting data is completed until the completion is confirmed (S371).

When it is determined in S371 by the cutting plotter that the cutting based on the cutting data has been completed, the multilayered printed matter is cut away from any parts but this printed matter on the medium 20 and obtained as a product.

As thus far described, the multilayered printed matter 10, 120 is provided with the white layer 32 and the black layer 33, which are the concealment print layers disclosed herein, between the front layer 31 and the back layer 34. Therefore, the back layer 34 may be better concealed in the multilayered printed matter being observed by the user 60 from the opposite side of the back layer 34 across the front layer 31, i.e., from the opposite side of the light source 50, under light coming from the side of the front layer 31, with no light from the light source 50 disposed on the opposite side of the front layer 31 across the back layer 34. In the multilayered printed matter 10, 120, among a plurality of patterns, a pattern closer to the light source 50 may be better concealed to be invisible from the front-surface side in the absence of light from the light source 50 on the back-surface side.

In the multilayered printed matter 10, 120, the black layer 33 exerts a higher light blocking effect than the white layer 32 in comparison between the black layer 33 and the white layer 32 that are equal in thickness. The combination of two concealment print layers; white and black layers 32 and 33, thinner than one white layer 32 may accordingly offer comparable concealability. Therefore, the whole concealment print layers may be favorably decreased in thickness in the multilayered printed matter 10, 120. In the multilayered printed matter 10, 120 under light emitted from the light source 50 disposed on the opposite side of the front layer 31 across the back layer 34, with light coming from the side of the front layer 31 being substantially blocked, light emitted from the light source 50 and transmitting through these concealment print layers may be scattered by the concealment print layers. In the multilayered printed matter 10, 120 configured as described above, however, the amount of scattering light may be reduced, and light emitted from the light source 50 may consequently allow the back layer 34 to be clearly visible from the side of the front layer 31. In the multilayered printed matter 10, 120 under light emitted from the light source 50 disposed on the opposite side of the front layer 31 across the back layer 34, with light coming from the side of the front layer 31 being substantially blocked, for example, light from the light source 50 may allow the pattern contour on the back layer 34 to be clearly visible from the side of the front layer 31.

The multilayered printed matter 10, 120 is provided with two concealment print layers; black layer 33 and white layer 32, made of the inks having different light blocking effects, and the white layer 32 made of the white ink has an inferior light blocking effect to the black layer 33. Therefore, the combination of two concealment print layers thinner than one concealment print layer made of the white ink may accordingly offer comparable concealability. The multilayered printed matter 10, 120 in which the concealment print layers combined are thus reduced in thickness may decrease ink consumption for the concealment print layers. The multilayered printed matter 10, 120 in which the concealment print layers combined are reduced in thickness may shorten time required to print the concealment print layers in case the concealment print layers are printed as, for example, described below. In a printing method using an inkjet printer in which positions of the inkjet heads 81 to 86 relative to the medium 20 are identical in the sub scanning direction, for example, the inks to be ejected to the medium 20 from the inkjet heads 81 to 86 may be increased by increasing the number of passes, i.e., the number of relative movements of the inkjet heads 81 to 86 to the medium 20 in the main scanning direction. In such a method, time required to print the concealment print layers may be shortened by forming the whole concealment print layers in a smaller thickness, i.e., by decreasing the inks to be ejected to the medium 20 from the inkjet heads 81 to 86 to form these layers.

If the light blocking effect of the concealment print layer on the side of the back layer 34 is too low in the multilayered printed matter 10, 120, the user 60 may readily see the pattern on the back layer 34 when the printed matter is under light coming from the side of the user 60, i.e., ambient light. If the light blocking effect of the concealment print layer on the side of the back layer 34 is too high in the multilayered printed matter 10, 120, the user 60 situated on the opposite side of the light source 50 may fail to see the pattern on the back layer 34 even when the printed matter is under light emitted from the light source 50. In the multilayered printed matter 10, 120, therefore, the blackness of the concealment print layer on the side of the back layer 34 may desirably be neither too high nor too low. When, for example, the thinner medium 20 is used in the multilayered printed matter 10, 120, light from the light source 50 is more likely to transmit through the medium 20. In that case, the blackness of the concealment print layer on the side of the back layer 34 may desirably be higher. In the multilayered printed matter 10, 120, the user 60 may be more likely to see the pattern on the back layer 34 when light from the side of the user 60, i.e., ambient light, is more intense. In that case, the blackness of the concealment print layer on the side of the back layer 34 may desirably be higher.

In the multilayered printed matter 10, 120 under light emitted from the light source 50 on the side of the back layer 34, with light coming from the side of the front layer 31 being substantially blocked, light emitted from the light source 50 is likely to transmit through a region 10b where the black layer 33 is unformed for the front layer 31 in the layer-stacking direction (see FIG. 6). This may allow for a highlighted display of the region 10b where the black layer 33 is unformed for the front layer 31 in the layer-stacking direction when the multilayered printed matter 10, 120 is observed by the user 60 from the opposite side of the light source 50 under light emitted from the light source 50 on the side of the back layer 34, with light coming from the side of the front layer 31 being substantially blocked.

In the multilayered printed matter 10, 120 according to this embodiment, the black layer 33 includes a portion 33a where the black layer 33 is unformed for the front layer 31 in the layer-stacking direction. In the multilayered printed matter 10, 120, the white layer 32 may include a portion where the white layer 32 is unformed for the front layer 31 in the layer-stacking direction.

In the multilayered printed matter 10, 120, the concealment print layer on the side of the back layer 34 is the black layer 33 that exerts a high light blocking effect, which suggests that an adequate light blocking effect may be attainable with the concealment print layer on the side of the back layer 34 reduced in thickness. In the multilayered printed matter 10, 120, the concealment print layer on the side of the back layer 34 may not necessarily be a black layer.

In the multilayered printed matter 10, 120, the concealment print layer on the side of the front layer 31 is the white layer 32 having a high degree of lightness. When the front layer 31 is observed by the user 60 from the opposite side of the light source 50 under light coming from the side of the front layer 31, with no light from the light source 50 disposed on the side of the back layer 34, the pattern presented by the front layer 31 may be improved in lightness by the concealment print layer on the side of the front layer 31 that excels in lightness. In the multilayered printed matter 10, 120, the concealment print layer on the side of the front layer 31 may not necessarily be a white layer.

In the multilayered printed matter 10, 120, the material of the concealment print layer on the side of the back layer 34 has a higher light blocking effect than the material of the concealment print layer on the side of the front layer 31. The concealment print layer on the side of the front layer 31 may accordingly have a higher degree of lightness than the concealment print layer on the side of the back layer 34. In the multilayered printed matter 10, 120, the concealment print layer on the side of the front layer 31, i.e., white layer 32, has a higher degree of lightness than the concealment print layer on the side of the back layer 34, i.e., black layer 33. When the front layer 31 is observed by the user 60 from the opposite side of the light source 50 under light coming from the side of the front layer 31, with no light from the light source 50 disposed on the side of the back layer 34, the pattern presented by the front layer 31 may be improved in lightness by the white layer 32 that excels in lightness.

In the multilayered printed matter 10, 120, the concealment print layer on the side of the back layer 34 has a higher light blocking effect and lower light reflectivity than the concealment print layer on the side of the front layer 31 in comparison between these layers that are equal in thickness. Such distinctiveness in terms of the light blocking effect and light reflectivity may result from different materials used or from structural differences in case the same material is used. The structural differences may include different particle sizes in the inks used or different ratios of particles included in the inks used.

The examples of the multilayer printing method illustrated in FIGS. 13 to 15 may successfully print at once all of the four layers; front layer 31, white layer 32, black layer 33, and back layer 34, by just moving the medium 20 relative to the inkjet heads 81 to 86, 181 to 191, 281 to 291 in one of the directions included in the sub scanning direction indicated by arrow 80b. This may achieve an improved accuracy in positioning the print layers relative to one another, as compared with any methods in which the print layers are formed one by one in their entirety. As a result, the multilayered printed matter 10, 120 thereby obtained may improve in quality.

In the embodiments described thus far, inkjet printing is used as the printing method for the multilayered printed matter. However, any suitable printing technique but inkjet printing may be employed in the printing method for the multilayered printed matter disclosed herein.

What is claimed is:

1. A multilayer printing method for printing a multilayered printed matter comprising a group of print layers formed on a transparent medium, the multilayer printing method comprising:
    a step of printing a pattern on the transparent medium as a first print layer;
    a step of printing a first concealment print layer that reflects incident light from a side of the first print layer to allow the first print layer to be visible from the side of the first print layer;
    a step of printing a second print layer that has a pattern different from the first print layer; and
    a step of printing a second concealment print layer disposed between the first concealment print layer and the second print layer,
    wherein in the step of printing the second concealment print layer, the second concealment print layer is printed with a color and a density that blocks light emitted from a side of the transparent medium from reaching the first print layer, and
    in the step of printing the first concealment print layer, the first concealment print layer is printed with a color and a density that prevents the second concealment print layer from being viewed from the side of the first print layer,
    wherein the first print layer, the first concealment print layer, the second print layer, and the second concealment print layer are printed on one side of the transparent medium.

2. The multilayer printing method according to claim 1, wherein
    the first concealment print layer and the second concealment print layer are printed such that, in a state where light is incident on the multilayered printed matter from a first printed layer side, and in a case when a light source from a side of the second print layer opposite to the first print layer is not incident on the multilayered printed matter, then the second print layer is concealed when the multilayered printed matter is observed from a side of the first printing layer opposite to the second print layer, and the first concealment print layer and the second concealment print layer are printed such that, in a state where light incident on the multilayered printed matter from the first printed layer side is substantially blocked, and in a case when a light from the light source is incident on the multilayered printed matter, then the second print layer is visible from the side of the first print layer by using the light incident from the light source, when the multilayered printed matter is observed from a side of the first printing layer opposite to the second print layer.

3. The multilayer printing method according to claim 2, wherein the second concealment print layer is smaller in thickness than the first concealment print layer.

4. The multilayer printing method according to claim 3, wherein the second concealment print layer is a black layer.

5. The multilayer printing method according to claim 3, wherein at least one of the first concealment print layer and the second concealment print layer is partly unformed for the first print layer in a layer-stacking direction.

6. The multilayer printing method according to claim 2, wherein the second concealment print layer is a black layer.

7. The multilayer printing method according to claim 6, wherein the first concealment print layer is a white layer.

8. The multilayer printing method according to claim 2, wherein at least one of the first concealment print layer and the second concealment print layer is partly unformed for the first print layer in a layer-stacking direction.

9. The multilayer printing method according to claim 2, wherein the first print layer and the second print layer are formed by an inkjet method.

10. The multilayer printing method according to claim 1, wherein at least one of the first concealment print layer and the second concealment print layer is partly unformed for the first print layer in a layer-stacking direction.

11. The multilayer printing method according to claim 1, wherein
the group of print layers are formed by an inkjet printer, the inkjet printer comprising:
a first head that is an inkjet head that ejects ink to form the first print layer;
a second head that is an inkjet head that ejects ink to form the first concealment print layer;
a third head that is an inkjet head that ejects ink to form the second concealment print layer; and
a fourth head that is an inkjet head that ejects ink to form the second print layer,
wherein the first head, the second head, the third head, and the fourth head are arranged in this order from an upstream side toward a downstream side in a certain direction, and
the group of print layers are formed by moving either one of the medium and a group of the first head, the second head, the third head, and the fourth head relative to the other solely in one of the certain direction and a direction opposite to the certain direction.

12. The multilayer printing method according to claim 11 wherein inks are ejected from the first head, the second head, the third head, and the fourth head onto the medium while either one of the medium and the group of the first head, the second head, the third head, and the fourth head is being moved relative to the other in a main scanning direction, regions targeted for ink ejection from the first head, the second head, the third head, and the fourth head have an equal length in a sub scanning direction orthogonal to the main scanning direction, the first head, the second head, the third head, and the fourth head are displaced from one another in the sub scanning direction by a dimension corresponding to the equal length, the certain direction is one of directions included in the sub scanning direction, and the medium is moved relative to the first head, the second head, the third head, and the fourth head in one of the directions included in the sub scanning direction by a dimension corresponding to the equal length in the sub scanning direction upon completion of each printing cycle using the first head, the second head, the third head, and the fourth head in the main scanning direction.

13. A multilayer printing method for printing a multilayered printed matter comprising a group of print layers formed on a transparent medium, the multilayer printing method comprising:
a step of printing a pattern on the transparent medium as a first print layer;
a step of printing a first concealment print layer that reflects incident light from a side of the first print layer to allow the first print layer to be visible from the side of the first print layer;
a step of printing a second print layer that has a pattern different from the first print layer; and
a step of printing a second concealment print layer disposed between the first concealment print layer and the second print layer,
wherein in the step of printing the second concealment print layer, the second concealment print layer is printed with a color and a density that blocks light emitted from a side of the transparent medium from reaching the first print layer, and
in the step of printing the first concealment print layer, the first concealment print layer is printed with a color and a density that prevents the second concealment print layer from being viewed from the side of the first print layer,
wherein the second concealment print layer is smaller in thickness than the first concealment print layer.

14. The multilayer printing method according to claim 13, wherein the second concealment print layer is a black layer.

15. The multilayer printing method according to claim 14, wherein the first concealment print layer is a white layer.

16. The multilayer printing method according to claim 13, wherein at least one of the first concealment print layer and the second concealment print layer is partly unformed for the first print layer in a layer-stacking direction.

17. A multilayer printing method for printing a multilayered printed matter comprising a group of print layers formed on a transparent medium, the multilayer printing method comprising:
a step of printing a pattern on the transparent medium as a first print layer;
a step of printing a first concealment print layer that reflects incident light from a side of the first print layer to allow the first print layer to be visible from the side of the first print layer;
a step of printing a second print layer that has a pattern different from the first print layer; and a step of printing a second concealment print layer disposed between the first concealment print layer and the second print layer, wherein in the step of printing the second concealment print layer, the second concealment print layer is printed with a color and a density that blocks light emitted from a side of the transparent medium from reaching the first print layer, and in the step of printing the first concealment print layer, the first concealment print layer is printed with a color and a density that prevents the second concealment print layer from being viewed from the side of the first print layer, wherein the second concealment print layer is a black layer.

18. The multilayer printing method according to claim 17, wherein the first concealment print layer is a white layer.

19. The multilayer printing method according to claim 17, wherein at least one of the first concealment print layer and the second concealment print layer is partly unformed for the first print layer in a layer-stacking direction.

\* \* \* \* \*